United States Patent
Kirrbach et al.

(10) Patent No.: US 12,143,153 B2
(45) Date of Patent: Nov. 12, 2024

(54) EYE-SAFE OPTICAL-WIRELESS COMMUNICATION

(71) Applicant: Fraunhofer-Gesellschaft zur Foerderung der angewandten Forschung e.V., Munich (DE)

(72) Inventors: René Kirrbach, Dresden (DE); Tobias Schneider, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 60 days.

(21) Appl. No.: 18/055,348

(22) Filed: Nov. 14, 2022

(65) Prior Publication Data
US 2023/0117710 A1   Apr. 20, 2023

Related U.S. Application Data

(63) Continuation of application No. PCT/EP2021/062104, filed on May 7, 2021.

(30) Foreign Application Priority Data

May 15, 2020   (DE) ................ 102020206180.7

(51) Int. Cl.
  *H04B 10/114*   (2013.01)
  *H04B 10/50*    (2013.01)
  *H04B 10/40*    (2013.01)

(52) U.S. Cl.
  CPC .......... *H04B 10/1143* (2013.01); *H04B 10/40* (2013.01); *H04B 10/50* (2013.01); *H04B 2210/08* (2013.01)

(58) Field of Classification Search
  None
  See application file for complete search history.

(56) References Cited

U.S. PATENT DOCUMENTS

| | | | |
|---|---|---|---|
| 2003/0026002 A1* | 2/2003 | Lopez-Hernandez | ...... H01S 3/005 359/641 |
| 2004/0042798 A1* | 3/2004 | Kehr | ...... H04B 10/43 398/129 |

(Continued)

FOREIGN PATENT DOCUMENTS

| | | |
|---|---|---|
| CN | 106856414 A | 6/2017 |
| WO | 02056507 A2 | 7/2002 |

(Continued)

OTHER PUBLICATIONS

DIN EN 60825-1*VDE 0837-1: Sicherheit von Lasereinrichtungen—Teil 1: Klassifizierung von Anlagen und Anforderungen (IEC 60825-1:2014); German version EN 60825-1:2014 + AC:2017 + A11:2021 + A11:2021/AC:2022 Jul. 2022.

(Continued)

*Primary Examiner* — Darren E Wolf
(74) *Attorney, Agent, or Firm* — PERKINS COIE LLP; Michael A. Glenn

(57) ABSTRACT

A communication node for optical-wireless communication in an optical-wireless communication network has: an input interface configured to receive a data signal, an optical transmitter configured to convert the data signal into an optical signal having an optical power, separation optics configured to spatially divide the optical signal into a plurality of optical partial signals having an associated spectral range to divide the optical power onto the plurality of optical partial signals, wherein the plurality of spectral ranges at least partially match. The communication node is configured to emit the plurality of optical partial signals for optical-wireless communication.

21 Claims, 11 Drawing Sheets

(56) References Cited

U.S. PATENT DOCUMENTS

| | | | |
|---|---|---|---|
| 2007/0292141 A1* | 12/2007 | Kim | H04B 10/1149 |
| | | | 398/182 |
| 2011/0116520 A1 | 5/2011 | Krijn et al. | |
| 2016/0281963 A1* | 9/2016 | Dussaume | H04B 10/116 |
| 2019/0363791 A1 | 11/2019 | Teo et al. | |
| 2019/0363792 A1 | 11/2019 | Tsonev et al. | |
| 2019/0379454 A1 | 12/2019 | Mitchell | |
| 2022/0029706 A1* | 1/2022 | Garcia-Marquez | |
| | | | G02B 6/0008 |

FOREIGN PATENT DOCUMENTS

| | | |
|---|---|---|
| WO | 2004061484 A2 | 7/2004 |
| WO | 2005122451 A1 | 12/2005 |
| WO | 2013032954 A1 | 3/2013 |
| WO | 2015086454 A1 | 6/2015 |

OTHER PUBLICATIONS

Pakravan, M. R., et al., "Holographic diffusers for indoor infrared communication systems", Proceedings of GLOBECOM'96. 1996 IEEE Global Telecommunications Conference, London, UK, 1996, pp. 1608-1612 vol. 3.

Säckinger, E., "Analysis and Design of Transimpedance Amplifiers for Optical Receivers", First Edition, John Wiley and Sons, 2018, 31 pages.

Tsonev, Dobroslav, et al., "Towards a 100 Gb/s visible light wireless access network", Optics Express 23, 1627-1637 (2015).

Zafar, F., et al., "Laser-Diode-Based Visible Light Communication: Toward Gigabit Class Communication", IEEE Communications Magazine, vol. 55, No. 2, pp. 144-151, Feb. 2017.

\* cited by examiner

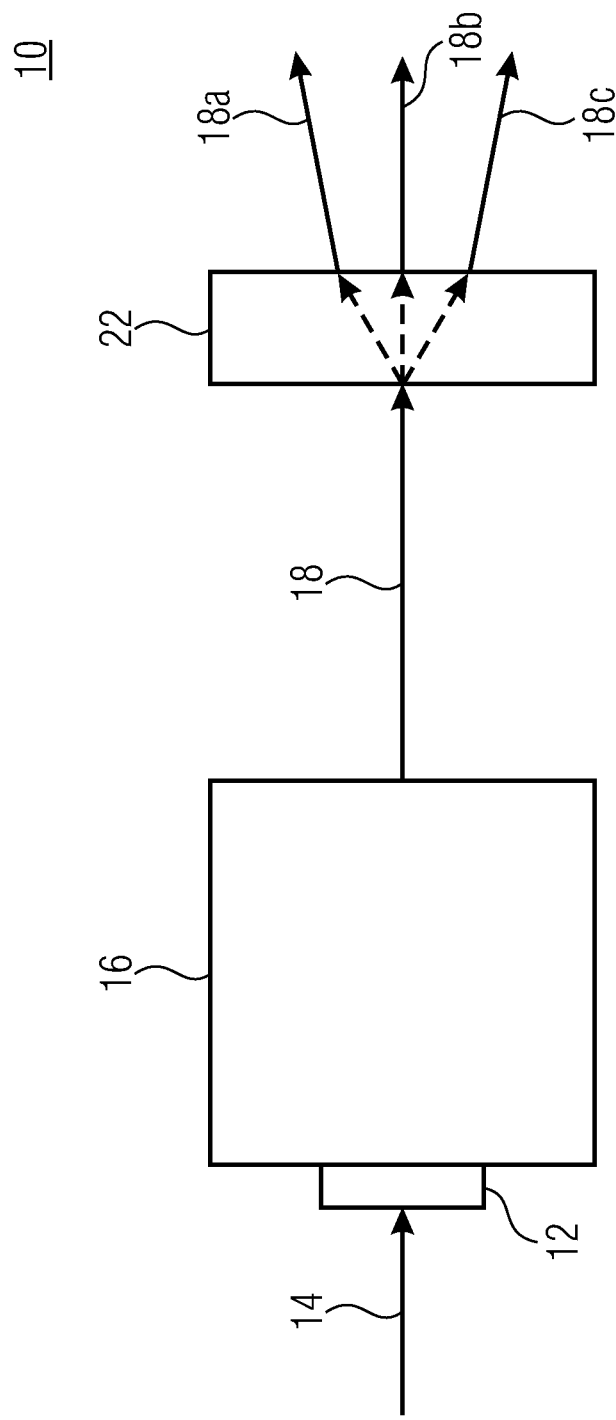

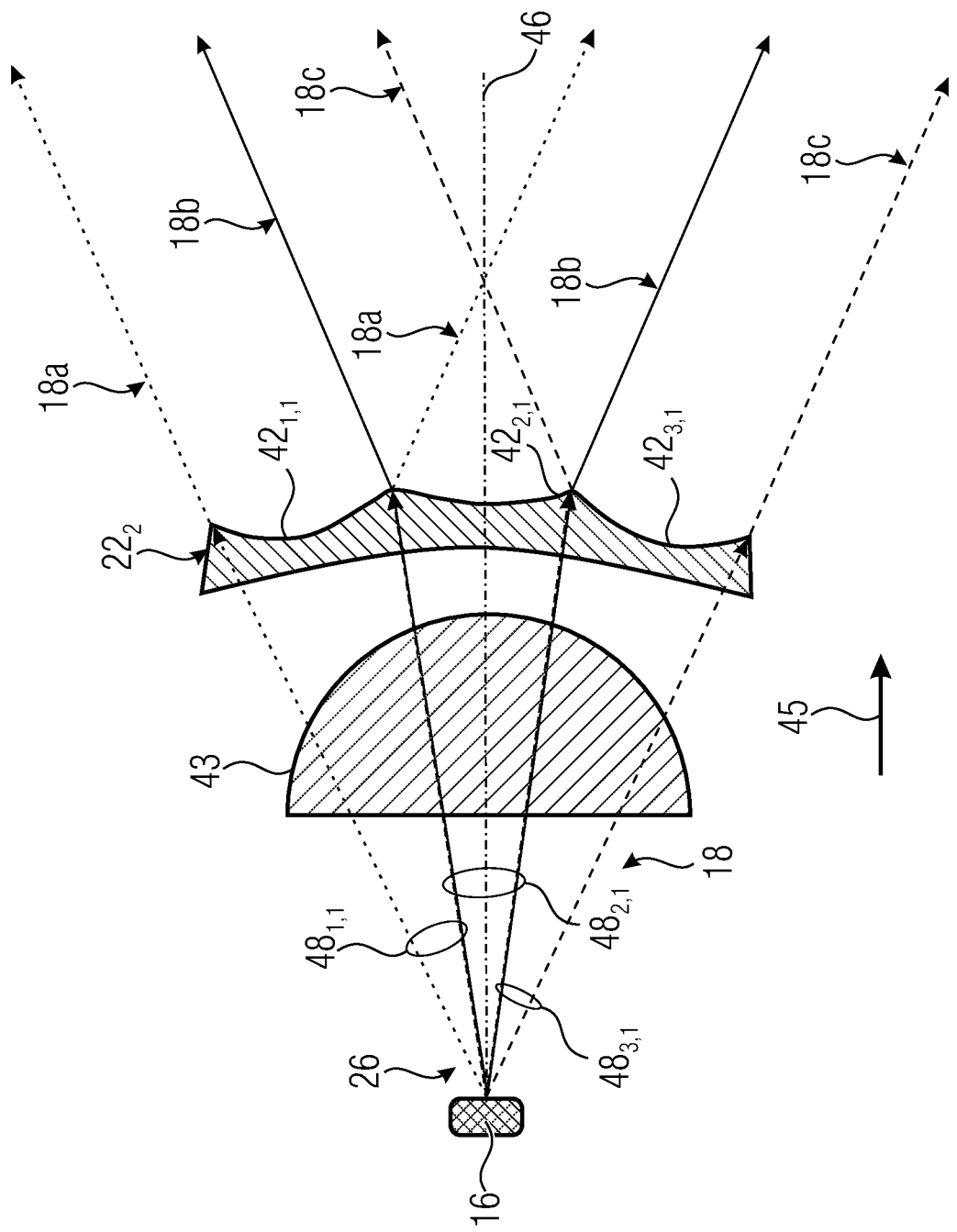

EYE-SAFE OPTICAL-WIRELESS COMMUNICATION

CROSS-REFERENCE TO RELATED APPLICATIONS

This application is a continuation of copending International Application No. PCT/EP2021/062104, filed May 7, 2021, which is incorporated herein by reference in its entirety, and additionally claims priority from German Application No. 102020206180.7, filed May 15, 2020, which is also incorporated herein by reference in its entirety.

TECHNICAL FIELD

The present invention relates to optical, wireless or optical wireless communication, and more particularly to a communication node for wireless optical communication, to a wireless optical transmission system comprising such a communication node, and to a method of providing separation optics for a wireless optical transmission system. The present invention further relates to a high-power transmitter for eye-safe optical-wireless communication.

BACKGROUND OF THE INVENTION

In optical-wireless communication, the goal is always to increase the detected optical power at the receiver since this results in an improved signal-to-noise ratio (SNR) at the receiver [2]. A high SNR allows a low bit error rate, i.e., reliable data transmission. Moreover, a high SNR can be used to increase the data rate of the link, for example by increasing the modulation bandwidth or using a multi-level modulation scheme. A direct way of maximizing the SNR at the receiver is increasing the signal power at the transmitter. Nowadays, lasers (light amplification by stimulated emission of radiation) or laser diodes are used for particularly high data rates due to modulation bandwidths of several gigahertz to several tens of gigahertz. Beams emitted by lasers are particularly ordered, i.e. their Étendue (product of ray cross-section and angle of divergence of the rays) is particularly small. As a result, they can be focused onto a very small point by means of lenses. This focusability also applies when laser light impinges on the human eye. For this reason, the permissible laser power is more tightly regulated by eye safety standards (DIN EN 60825-1:2015-07 [3]) when compared to conventional lamp devices. In order for a laser to be used for communication without the need for shielding measures, the laser is to comply with laser class 1/1R or laser class 2/2R (if laser visible). Therefore, the extent to which the SNR at the receiver can be increased by increasing the transmission power is limited.

In practice, there are different approaches for classifying the transmitter of an optical-wireless link as laser class 1/1R or laser class 2/2R:

1. The driver of the laser is limited so that the power of the laser is restricted such that the threshold values of eye safety are observed. This results in the disadvantage of low transmission power which results in a low range.

2. The laser is modulated such that it only radiates for very short periods of time or only radiates in one direction for short periods of time. For example, LIDAR (Light Detection and Ranging) emits strong impulses, but only for a short time, or these impulses propagate in one direction only for a short time. The exposure energy for the eye can thus be kept below the threshold values. The disadvantage is that only a fraction of the total time can be used for communication. Accordingly, the data rate is limited.

3. A diffuser which scatters the light is placed in front of the laser [2]. However, the light then spreads randomly in all directions so that a considerable part of the light power is lost for communication.

4. A so-called "engineered diffuser" [6] is used. These optical elements have an optimized structure that directs light with a defined input angle (typically 0°, i.e., parallel light beams) to a defined output profile. The high efficiency is advantageous for communication. However, the high manufacturing costs and the defined input angle are of disadvantage. The latter is typically 0° so that an additional collimator lens is used.

5. Using a holographic diffuser [2, 4]. The high efficiency obtained by this is advantageous for communication. In some cases, these diffusers can be manufactured to be cheaper than engineered diffusers. A disadvantage is the defined incidence angle. The output angle is typically larger than the incidence angle. For small fields of view, an additional collimator lens is needed, i.e. two optical components are used. Another disadvantage is the fact that the output profile follows a Gaussian distribution. For optical-wireless communication, a top-head profile is often needed/ of advantage to optimize the dynamic range of the link.

6. Using several laser sources [5]. By using several emitters, for example by using a VCSEL (Vertical-Cavity Surface-Emitting Laser) array, the total power can be distributed to several partial sources. The disadvantage of this is the complex structure.

Consequently, communication nodes and communication systems as well as concepts for providing the same which enable eye-safe communication with high range and data rate would be desirable.

Therefore, the object underlying the present invention is to provide communication nodes and communication systems that enable eye-safe high-speed communication with high range and data rate.

SUMMARY

According to an embodiment, a communication node configured for optical-wireless communication in an optical wireless communication network may have: an input interface configured to receive a data signal; an optical transmitter configured to convert the data signal into an optical signal having an optical power; separation optics configured to spatially divide the optical signal into a plurality of optical partial signals having an associated spectral range to divide the optical power onto the plurality of optical partial signals, the plurality of spectral ranges at least partially coinciding; wherein the communication node is configured to emit the plurality of optical partial signals for the optical-wireless communication; wherein the plurality of optical partial signals is focused at spatially disjoint locations of an image plane when focused together, when using receiver-side optics or when focusing at or in the human eye.

According to another embodiment, an optical-wireless transmission system may have: an inventive communication node as mentioned above; and a receiver configured to receive at least a portion of the plurality of partial signals; wherein a field of view of the communication node is adapted to receiving optics of the receiver.

Another embodiment may have a method of providing separation optics for an optical-wireless communication node having a plurality of optically active surfaces, wherein the following steps are performed for each of the optically active surfaces: projecting an inhomogeneous radiation power of an optical emitter onto a projection region by defining a plurality of sub-regions of the projection region such that partial radiation powers of the radiation power incident on the sub-regions are equal within a tolerance range in the plurality of sub-regions; defining input angles of radiation power onto the optically active area of the separation optics and associating a respective output angle each to the plurality of partial radiation powers from the separation optics, the output angles being derived from the sub-region of the projection region; defining the plurality of sub-regions for the optically active surface of the separation optics such that, when the radiation power arrives, the separation optics transforms the radiation power with the plurality of sub-regions into a partial radiation power for the projection area associated with a respective sub-region; and producing the separation optics having the plurality of optically effective surfaces.

A core idea of the present invention is having recognized that, by using suitable separation optics, a light power of an optical emitter can be divided such that several optical partial signals are obtained. The several optical partial signals are focused onto different local regions on the receiver side and/or on the eye side, and therefore the divided light power impinges on focal regions separated from one another so that high a light power can be transmitted, but damage to the human eye can be reduced or prevented. The high transmission power enables communication with high range and data rate. The aforementioned objects can be fulfilled by implementing appropriate separation optics, by integrating such separation optics into a communication node and by using such a communication node in an optical-wireless communication network.

According to an embodiment, a communication node implemented for optical-wireless communication in an optical-wireless communication network comprises an input interface configured to receive a data signal. The communication node further comprises an optical transmitter configured to convert the data signal into an optical signal having an optical power. Furthermore, the communication node comprises separation optics configured to spatially divide the optical signal into a plurality of optical partial signals having an associated spectral range to divide the optical power onto a plurality of optical partial signals, wherein the plurality of spectral ranges at least partially match. The communication node is configured to emit the plurality of optical partial signals for optical-wireless communication.

According to an embodiment, an optical-wireless transmission system is provided, comprising an aforementioned communication node and further comprising a receiver configured to receive at least a portion of the plurality of partial signals, wherein a field of view of the communication node is adapted to receiving optics of the receiver. Advantageously, the adaptation may reduce or avoid losses in the optical-wireless transmission path.

According to an embodiment, a method of providing separation optics for an optical-wireless communication node having a plurality of optically active surfaces comprises a plurality of steps performed for each of the optically active surfaces. The method comprises projecting an inhomogeneous radiation power of an optical emitter onto a projection region by defining a plurality of sub-regions of the projection region such that a partial radiation power of the radiation power incident on the sub-region is equal within a tolerance range in the plurality of sub-regions. The method comprises defining input angles of the radiation power onto the optically active surface of the separation optics and associating a respective output angle each to the plurality of partial radiation powers from the separation optics, wherein the output angles are derived from the sub-regions of the projection region. The method comprises defining the plurality of sub-regions for the optically active surface element of the separation optics such that, when the radiation power arrives, the separation optics transforms the radiation power with the plurality of optically active surfaces into a partial radiation power for the projection region associated with a respective sub-region. The method further comprises producing the separation optics with the plurality of optically effective surfaces.

BRIEF DESCRIPTION OF THE DRAWINGS

Embodiments of the present invention are explained below with reference to the accompanying drawings, in which:

FIG. 1 shows a schematic block diagram of a communication node according to an embodiment;

FIG. 3c shows a schematic side sectional view of a communication node comprising a transit time difference compensation element, according to an embodiment;

DETAILED DESCRIPTION OF THE INVENTION

Figure 2A:
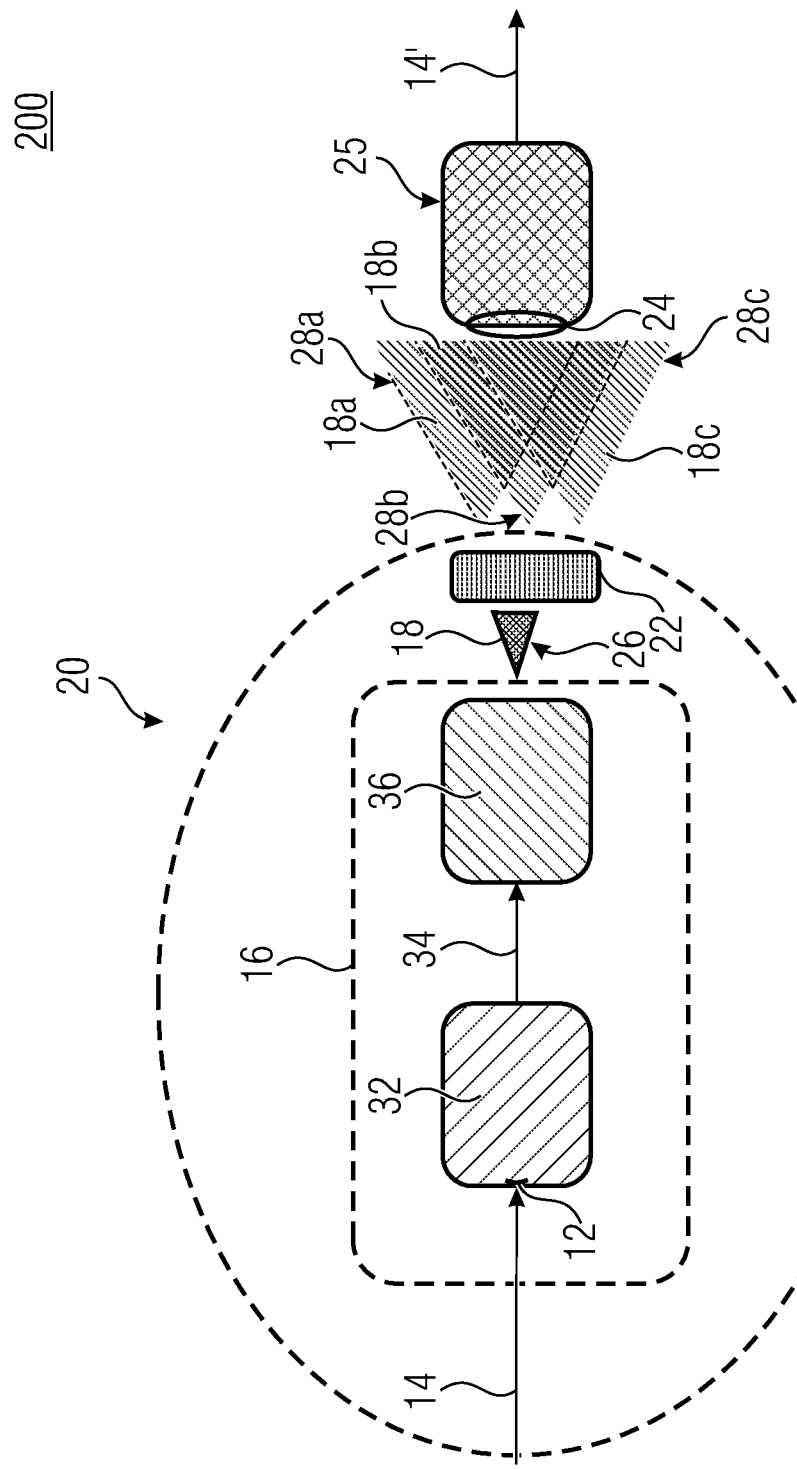
FIG. 2a shows a schematic block diagram of an optical-wireless transmission system according to an embodiment in which the communication node comprises a transmitter with a modulated radiation source.

Before embodiments of the present invention are explained in detail below with reference to the drawings, it is pointed out that identical elements, objects and/or structures or those of equal function or equal effect are provided with the same reference signs in the different figures so that the description of these elements shown in different embodiments is interchangeable or mutually applicable.

Embodiments described below are described in the context of a plurality of details. However, embodiments may also be implemented without these detailed features. Furthermore, for the sake of clarity, embodiments are described using block diagrams as a substitute for a detailed representation. Furthermore, details and/or features of individual embodiments can be readily combined with one another unless explicitly described to the contrary.

The following embodiments relate to optical-wireless signal transmission or data transmission. This is also referred to as Li-Fi (Light Fidelity; Light Transmission) in the context of the embodiments described herein. As used herein, the term "Li-Fi" refers to terms such as IrDA (Infrared Data Association) or OWC (Optical Wireless Communication). This means that the terms "optical-wireless data transmission" and "Li-Fi" are used interchangeably. In this context, optical-wireless data transmission is understood to mean transmitting an electromagnetic signal through a free transmission medium, for example air or another fluid. For example, wavelengths in the ultraviolet (UV) range of at least 53 nm and the infrared range, for example at most 1550 nm, may be used for this purpose, although other wavelengths different from wavelengths used for radio standards are also possible. An optical-wireless data transmission is also to be distinguished from a fiber-based optical data transmission, implemented for example by means of optical waveguides or optical fiber cables.

FIG. 1 shows a schematic block diagram of a communication node 10 according to an embodiment. The communication node 10 comprises an input interface 12 configured to receive a data signal 14. The data signal 14 may be wired and/or received wirelessly, and any transmission methods are possible for this purpose, for example wireless networks and/or wireless optical transmission media.

The communication node further comprises an optical transmitter 16 configured to convert the data signal 14 into an optical signal 18 having an optical power. The optical transmitter 16 may comprise, for example, a laser or a laser diode. Other examples of an optical transmitter include light-emitting diodes (LEDs), for example, and in particular high-speed LEDs, such as resonant cavity LEDs (RC LEDs), or micro LEDs may be considered. Alternatively, however, other elements for generating the optical signal 18 are also possible, for example fluorescent emitters or other illuminants. Combinations of the above options may also be considered.

Although the communication node 10 is described to be a transmitter of an optical-wireless signal, it may be implemented to transmit and/or receive wireless optical signals based on a corresponding configuration of the transmitter 16, as a receiver, for example. This means that the transmitter 16 may also be implemented to be a pure receiver or a pure transmitter or a combination thereof.

The communication node 10 further comprises separation optics 22 configured to spatially divide the optical signal 18 into a plurality of optical partial signals 18a-c. The number of optical partial signals 18a-18c may be at least 2, at least 3, at least 4, at least 5, or more, although the number may also be at least 10, at least 100, or at least 1000. The separation optics 22 is configured to spatially divide the optical signal 18, meaning that the wavelength ranges of the partial signals 18a-18c may fully or partially coincide and also coincide with the optical signal 18. However, differences in the wavelength ranges may arise, for example, due to different absorptions or attenuations acting on the optical signal 18 in respective sub-regions of the separation optics 22. However, the partial signals 18a-c have an identical source, namely the optical signal 18. In other words, the separation optics 22 may be used to split the optical signal 18 into the optical partial signals 18a-c which are spatially spaced apart from one another, but match in terms of information content and wavelength range.

The communication node 10 is configured to emit the plurality of optical partial signals for optical-wireless communication. Here, the optical partial signals 18a-c have a substantially same direction, which may be directed, for example, towards a receiver that receives at least a portion, high portion or all of the optical partial signals 18a-c and combines them with one another such that due to the combination of the received optical partial signals 18a-c, the sum of the received optical power at the receiver is high and a high SNR can be obtained. This enables a high transmission quality and thus a high bandwidth can be obtained. By dividing the optical signal 18 into the partial signals 18a-c, high eye safety can also be obtained since the plurality of optical partial signals are focused at spatially disjoint locations of an image plane when focused together, such as when using a corresponding optical system at the receiver side or also when focused at or in the human eye, which can lead to stress or damage at the spatially disjoint locations of an image plane of the human eye, the retina. That is, before a corresponding damage occurs, an overall higher light power can be transmitted so that, compared to a single partial beam, a higher signal power can be transmitted, but at the same time the losses of a diffuser are avoided, which is beneficial for the power budget. For example, a spacing of focal points can be obtained with a common focusing whose radiation power is individually below the previously mentioned standard DIN EN 60825-1 or IIC 60825-1: 2014. For example, each one of these focal points may comply with the corresponding standard. However, since there is a spatial spacing between the focal points, the eye is not damaged to an extent that reaches the corresponding threshold values, which is why comparatively higher light powers are permissible in the output signal 18. The threshold value can thus be understood as a flexible value. This can be calculated according to a calculation rule in which the extension of the so-called apparent source is included, for which the extension of the focal point can be measured. If, for example, 2 or more focal points were considered, the diameter which these 2 or more focal points together form could be assumed for determining the threshold value. However, the resulting threshold value is then significantly higher compared to a single focal point because the diameter is larger. In order to be classified to be eye-safe, both variations may have to be fulfilled, i.e.:

Each focal point is—considered by itself—eye-safe (for this consideration the threshold value is comparatively low, but the power of the one focal point is also low).

All focal points together are eye-safe (here the threshold value is much higher).

The optical transmitter 16 may be configured to provide the optical signal 18 at a communication wavelength. The separation optics 22 may be formed to be of low absorption for this communication wavelength range, allowing for low optical losses.

The communication node 10 may be configured to emit the optical-wireless signal in a wavelength visible to the human eye, and to provide illumination of an environment of the communication node with the optical-wireless signal. This enables synergistic use of a radiation power, both for data transmission and for illumination. This is unproblematic in that, by means of the separation optics 22, the human eye is protected from damage, even when high light powers are used. Alternative embodiments are to use a wavelength spectrum not visible to the human eye. For example, the infrared, near-infrared, or ultraviolet spectrum could be used for this.

FIG. 2a shows a schematic block diagram of an optical-wireless transmission system 200 according to an embodiment. The optical-wireless transmission system 200 includes a communication node 20 according to an embodiment, and a receiver 25 according to an embodiment. The receiver 25 is configured to receive at least a portion of the plurality of partial signals 18a-18c. In this regard, a field of view of the communication node 20 is adapted to receiving optics 24 of the receiver 25. The receiver 25 is configured to generate, based on the partial signals 18a-18c, a data signal 14' whose content is based on the data signal 14.

A typical emission angle in the sense of a half angle of the transmitter 16, that is a half angle of the beam 26 may be, for example, in a range from 3° to 50°, advantageously between 6° and 30°, and particularly advantageously between 8° and 20°, particularly when using VCSELs or other lasers which may have a rotationally symmetrical output profile. Edge emitters, which may, for example, be polygonal, such as rectangular, may on the other hand have an emission angle between 1°×3° and 15°×45°, advantageously between 3°×8° and 12°×30° and particularly advantageously between 6°×12° and 9°×25°.

The receiver 25 may be arranged such that the receiving optics 24 receives at least 70% of an area portion of a total field of view of the communication node 20, that is at least 70% of an area illuminated by the total number of optical partial signals 18a-18c is received by the receiving optics 24, which enables a high SNR or low light powers.

The communication node 20 may be similar in structure to the communication node 10. The communication node 10 may also be alternatively or additionally disposed in the optical transmission system 200. The separation optics 22 may be configured to split a beam 26 of the optical transmitter 16, that is a beam forming the optical signal 18, and a plurality of partial beams 28a-28c, which may be represented by the respective partial signals 18a-c. The plurality of partial beams 28a-c may collectively form an overall field of view or illumination area of the communication node 20. In this regard, it is possible and of advantage, but not necessary, for the beams 28a-c to overlap.

The optical transmitter 16 of the communication node 20 may include a driver 32 configured to provide a drive signal or signal current 34 based on the data signal 14 to drive an emitter 36, such as an LED, laser, or laser diode, to generate the optical signal 18. To this end, the input interface 12 may, for example, be connected to or form part of the driver 32. In particular, it is advantageous to use a laser/laser diode since the separation optics 22 allows the use of high transmission powers.

Figure 2B:
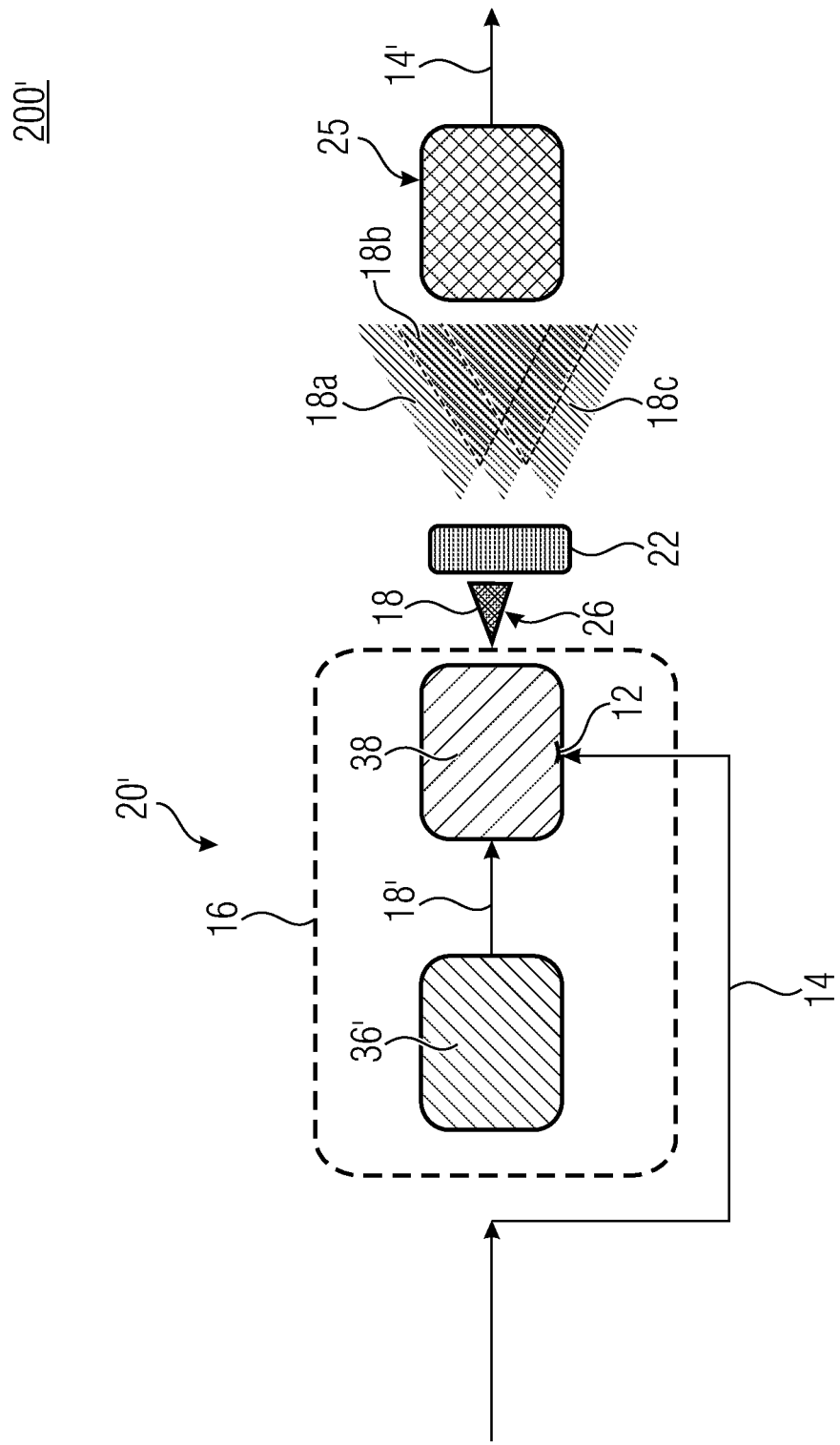
FIG. 2b shows a schematic block diagram of an optical-wireless transmission system according to an embodiment in which the communication node comprises a transmitter with an unmodulated radiation source.

FIG. 2b shows a schematic block diagram of another optical-wireless transmission system 200' according to an embodiment. Compared to the optical-wireless transmission system 200 of FIG. 2a, a communication node 20' is provided in a configuration different from the communication node 20 to generate the optical signal 18. For example, an emitter 36' may be operated as an unmodulated, i.e. constant, radiation source to provide an unmodulated, possibly information-free optical signal 18'. This is manipulated or modulated by means of a modulator 38, which may receive the data signal 14 by means of the input interface 12, to obtain the optical signal 18.

It should be noted that a position of the input interface 12 in the embodiments described herein is selected by way of example only, and the interface may be located elsewhere and may be transmitted to another position by means of a data transmission internal to the communication node.

In other words, FIGS. 2a and 2b show two different possible implementations of the entire data transmission link with high-power optical transmitters.

The system in FIG. 2a uses a transmitter with direct modulation of the emitter. The system according to FIG. 2b, on the other hand, uses an emitter with external signal modulation. In FIG. 2a, an incoming signal 14 is shown, which is to be transmitted in an optical-wireless manner. For example, the signal is a wideband-modulated signal (for example, on-off keying modulated), or a narrowband-modulated signal (such as comprising a single carrier or multiple carriers, for example, in orthogonal frequency division multiplexing). The signal is fed into a driver 32 that drives a signal current 34 through the emitter 36 or applies the corresponding signal voltage to the emitter (e.g., LED, laser, laser diode), with the goal of modulating the optical output signal 18 accordingly. The signal 18 is emitted with a profile characteristic of the emitter 36. The separation optics 22 is used to subdivide the optical signal 18 into several beams 18a-c or $18_i$ ($i \in [1; N]$, with $N \geq 2$), which then illuminate the field of view accordingly. Several or even all of the beams $18_i$ impinge on the optical receiver 25. Generally, however, this means that only parts of the light power of the beams $18_i$ impinge on the receiver since sometimes an attempt is made to illuminate a large region in order to achieve a large coverage. The receiver 25 converts the optical signal into an electrical output signal 14' and consists of, for example, the usual optical, optoelectronic, electronic and electrical components. In this respect, a detailed description of the receiver 25 will be omitted here.

FIG. 2b represents an incoming signal which is also to be transmitted in an optical-wireless manner. In analogy to FIG. 2a, it is already broadband-modulated or narrowband-modulated. The signal 14 is fed into an external modulator 38, such as comprising a Mach-Zehnder modulator, acoustic-optical modulators, electro-optical modulators, modulators based on multi-quantum layers or the like. The modulator 38 modulates the optical output signal 18' from the emitter 36'. In contrast to the system 200, the emitter 36' in the system 200' is exemplarily an unmodulated radiation source, that is the output power is at least approximately constant (for example in terms of a continuous wave (CW) value) and the external modulator 38 changes, for example, its absorption characteristics to produce a modulated optical output signal 18. The components 26, 22, $18_i$, 25 and 14' may be identical or at least similar to those in the optical-wireless transmission system 200.

That means that the communication node may be configured to receive and process the data signal as a broadband-modulated or narrowband-modulated data signal. As shown in FIG. 2a, the optical transmitter 16 may comprise a modulating radiation source 36. Alternatively or additionally, as shown in FIG. 2b, the optical transmitter 16 may comprise a modulator 38 apart from the optical emitter 36' for providing an optical signal 18'. The modulator 38 may be configured to receive and modulate the optical signal 18' to provide the optical signal 18 as a modulated signal. The modulator 38 may be configured to modulate the optical signal 18' based on current control, for example by implementing intensity modulation and/or polarization modulation.

Figure 3A:
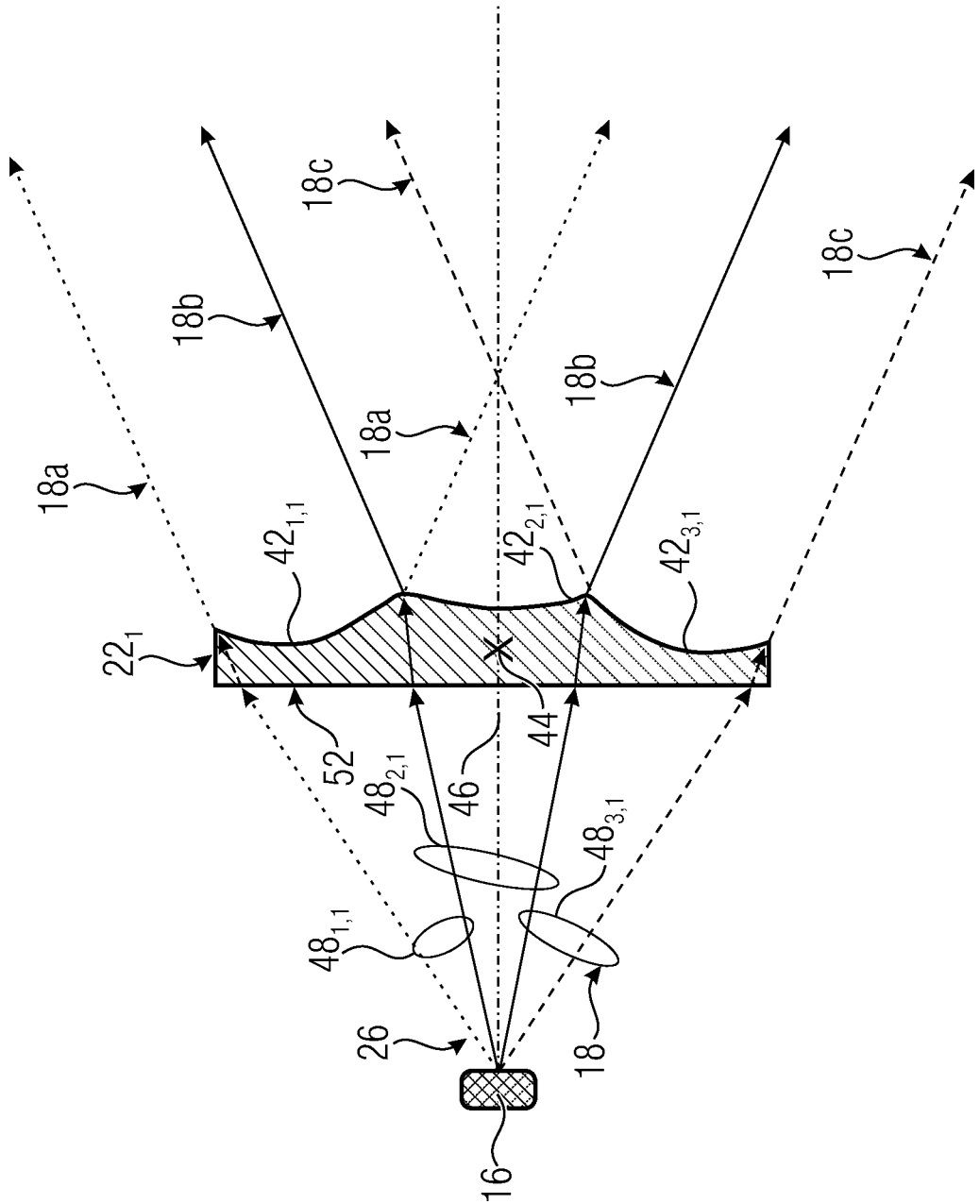
FIG. 3a shows a schematic side sectional view of separation optics with a planar surface according to an embodiment.

FIG. 3a shows a schematic side sectional view of a communication node 30, with separation optics 221 according to an embodiment, which can be used in the communication node 10 and/or the optical-wireless transmission system 200 or 200' to split the optical signal 18 into the partial signals $18_i$. Exemplary shown for this purpose is the transmitter 16, which in principle may be formed in accordance with the explanations of FIG. 1, FIG. 2a and/or FIG. 2b. The separation optics 22$_1$ may have a plurality or multitude of optically effective surfaces 42, which may be arranged, for example, in a two-dimensional array or field, in particular an N×M field. The optically effective surfaces are therefore denoted by indices i with (i∈[1; N] and j with j∈[1; M]), in the form $42_{i,j}$. At least one of N and M is ≥2. The indices can provide an indication of a placement of the respective element in the array and can be used for distinguishability. Exemplarily shown in FIG. 3a is a number of three elements for N=1, that is optically effective surfaces $42_{1,1}$, $42_{2,1}$ and $42_{3,1}$. The optically effective surfaces 42 may, simplified, be referred to as a partial lens of a lens combination, that is at least one of the optically effective surfaces is formed as a partial lens configured to refract an associated part of the optical signal 18, in particular that part of the optical signal 18 impinging on the optically effective surface 42. Each of the optically effective surfaces 42 may be formed as a freeform.

A center point 44 of the separation optics, such as a center of mass or a geometric center point, may be arranged on an optical axis 46 of the transmitter 16 with a deviation of at most 2 mm, 0.5 mm or 0.1 mm. Notwithstanding the above, a deflection of the optical partial signals 18a, 18b and/or 18c may be obtained by the design of the optically effective surfaces described in detail below. Alternative embodiments provide for arranging the center point 44 away from the optical axis 46 of the optical transmitter 16. This allows a further degree of freedom in which an angle of incidence of optical radiation starting from the optical transmitter 16 onto the surface can be varied for both planar, flat surfaces 52 and curved surfaces 52'.

Thus, beams $48_{i,j}$ may be associated with a respective optically effective surface $42_{i,j}$ and an effect on the beam $48_{i,j}$ may be defined by means of the optically effective surface $42_{i,j}$, such as a focusing, scattering, and/or directional change.

Figure 3B:
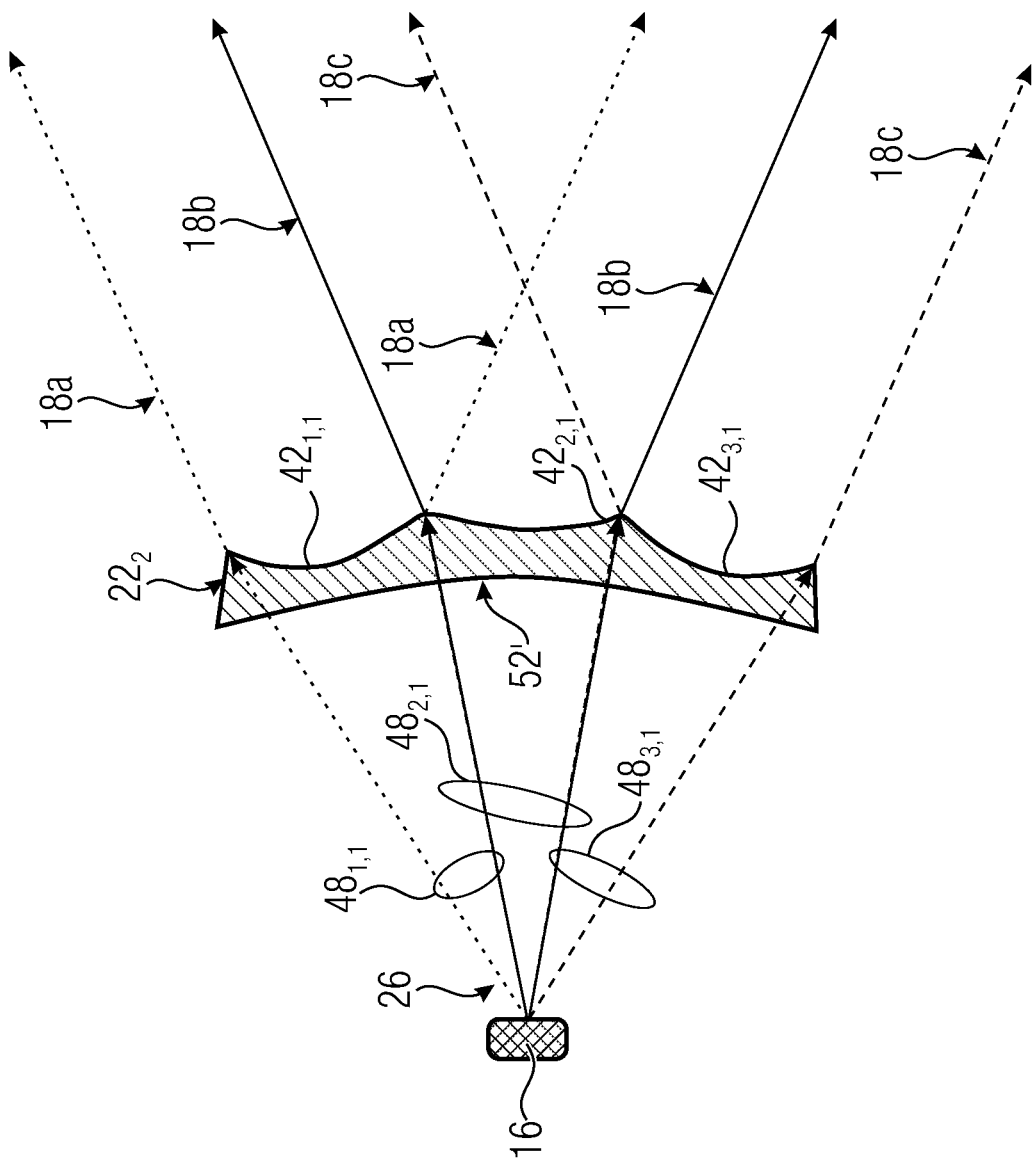
FIG. 3b shows a schematic side sectional view of separation optics with two curved surfaces according to an embodiment.

A surface 52 of the separation optics 22$_1$ facing the transmitter 16 may be flat or planar, as shown in FIG. 3a, but may also deviate therefrom and/or be optically effective, as shown for the surface 52' of the separation optics 22$_2$ of FIG. 3b. The surface 52' can be adapted as desired, for example at least partially as a spherical surface, at least partially as an aspherical surface, convex or concave or also formed as a free form or other shape, for example, in order to reduce or increase a lens volume or in order to achieve tolerance compensation or delay compensation.

Both separation optics 22$_1$ and 22$_2$, like the other separation optics described herein, allow the optical partial signals $18_i$ to be generated with matching data information, as they may all originate from a single data source. The separation optics may be arranged in a communication node such that the separation optics receive at least 80%, at least 90%, or at least 95% of a radiation power emitted from the optical transmitter. An optical signal power of the optical signal may be such that without the separation optics it exceeds an eye safety for the human eye, which means damages or does not meet the respective standard/requirement, but the plurality of optical partial signals in sum maintains the eye safety due to the separation optics. This can be obtained, as described, by focusing the different beams or partial signals spatially spaced apart from one another, which locally results in falling below the threshold values and in the area average also allows falling below the threshold values. In this regard, the separation optics 22 may generate a multiple image of the optical signal 18 from the transmitter so that, just as an image, a data content of the partial signals $18_i$ is identical or the same. Each optical partial signal $18_i$ may be adapted to a common overall field of view of the plurality of optical partial signals, that is a field of view or an illumination area of the communication node. For example, targets for a radiation power distribution at the receiver may be taken into account in the design, while considering corresponding indications such as distance, size and/or position of the receiver optics and the like.

Embodiments allow a communication node to be formed without a collimator lens in an optical path starting from the optical transmitter 16.

In other words, since the separation optics allow for higher optical transmission power, different realizations can be re-implemented. Common to all of them is that they subdivide the signal 18 of a plurality of beams and direct it into the field of view in the form of the sub-beams $18_i$. To this end, at least one of the surfaces comprises N×M optical elements, wherein each optical element may be an assembly of a plurality of optical sub-surfaces, and wherein the indices i, j may be used such that i∈[1; N] and j∈[1; M]). Each optical element may be a freeform. Each beam sweeps a part of the entire field of view. For all embodiments, it is also conceivable for the separation optics 22 not to be placed in the center, i.e. on the optical axis with respect to the transmitter 16, but also next to it. If the separation optics 22 is placed on the axis, a double axial symmetry results for the multipath optics if the field of view and the emission profile of the transmitter 16 are also symmetrical. If the separation optic 22 is placed next to the axis, at least one of these axes of symmetry is dropped, even if the field of view is symmetrical.

In embodiments, the separation optics/separation optics may be based on refraction, as shown, for example, in FIGS. 3a and 3b. FIG. 3a shows a system in which the first surface 52 is planar and the second surface consists of, or at least includes, the optical elements $42_{i,j}$. The modulated optical signal 18 emitted by the transmitter may be subdivided into several beams $48_{i,j}$. These first impinge on the first surface 52 of the optics 22$_1$. Each of the beams $48_{i,j}$ impinges on a differently shaped surface element $42_{i,j}$ of the optics 22$_1$ and is accordingly refracted differently such that the beams 18, or $18_{i,j}$ cover all or part of the field of view.

The configuration of a communication node 30$_2$ according to FIG. 3b shows by way of example that the first surface 52' of the optics 22$_2$ can also be designed differently, for example as a spherical surface, aspherical surface or also as a free form, for example in order to reduce the lens volume. Alternatively or additionally, it is possible to achieve tolerance or transit time difference compensation. The system according to FIG. 3b otherwise works analogously to the system of FIG. 3a. The beams $48_{i,j}$ impinge on different surface elements $42_{i,j}$, which direct the beams $18_{i,j}$ into the field of view such that the anticipated irradiance results. In this respect, FIGS. 3a and 3b show schematic representations of exemplary implementations of the separation optics based on refraction. All the elements can be understood to be three-dimensional bodies, which are generally not rotationally symmetrical.

A further advantageous embodiment will be explained with reference to FIGS. 3a and 3b, wherein it is noted that these implementations and features can be readily applied to other embodiments, in particular refracting, reflective separation optics or total reflective separation optics.

Due to different materials of the surrounding medium and a material of the separation optics, different propagation velocities, light velocities, of the optical signal 18 or the partial signals 18a-c may occur within the separation optics $22_1$ or $22_2$ when compared to the external medium. Thus, a different path length of the optical paths of the partial signals 18a-c to and through the separation optics $22_1$ and $22_2$ may result in transit time differences or phase shifts between the partial signals 18a-c. In other words, since the partial signals 18a-c in such a case have travelled a slightly different path or different path lengths to the receiver, for example because they all impinge on a different part/region of the separation optics, there will be transit time differences through the optical channel.

These effects can be used to compensate for different path lengths of the beams outside the medium. For communication nodes described herein, this can remain without relevant adverse effects, since the transit time difference can be small in relation to the symbol duration of the modulated data. For example, at a data rate of, e.g., at least 10 Gbits/s (on-off keying—OOK), the effect may be significant so that taking the same into consideration may have significant advantages. For example, the transit time differences at the separation optics can be compensated by the thickness of the optics (e.g. thicker in the middle than at the edge, as shown in FIG. 3a). The following calculations illustrate this effect by way of example:

A baud rate of 1 Gbits/s can mean a bit duration of 1 ns for OOK. Assuming a tolerable jitter of 10%, this can mean: $\frac{1}{10}*1$ ns=0.1 ns. Assuming a speed of light in the transmission medium, for example air, of c~30 cm/ns, this can mean a tolerable path difference of at most 3 cm.

At a baud rate of 10 Gbits/s, this results in a bit duration of 0.1 ns for OOK. The unchanged jitter of 10% results in a time offset of $\frac{1}{10}*0.1$ ns=0.01 ns, which means a path difference of at most 3 mm with c~30 cm/ns. This can be achieved quickly, for example if the lens has a diameter of 25 mm, so that the explained embodiments can remedy this.

It is alternatively or additionally provided for to compensate at least a part of the path difference by an optical element additional to the refractive optics, which causes the delay. This enables a simpler design of the separation optics at the expense of an additional component.

Depending on the data rate and the spatial extension of the separation optics 22, relevant or critical transit time differences could result. Embodiments therefore provide for compensating for these transit time differences in the implementation of the separation optics.

The transit time difference can be divided into two parts:

A first portion arises within the communication node 10 and/or 20 since central beams, such as the beam $48_{2,1}$, travel a shorter path than those that impinging on the edge of the separation optics $22_i$, such as the rays of the beams $48_{1,1}$ or $48_{3,1}$. This portion may be independent, at least in large part, of the relative spatial arrangement between the transmitter 10/20 and the receiver 25.

According to embodiments, the separation optics $22_i$ is configured to at least partially compensate for a transit time difference of beams 48 between the optical transmitter 16 and the separation optics $22_i$ due to different transit times within the separation optics $22_i$. The first portion of the transit time difference can be reduced by taking advantage of the different propagation velocities of electromagnetic radiation in different media. Since central rays have the shortest path, some embodiments provide for designing or implementing the separation optics there such that these rays travel the longest path through the optics material to extend their transit time within the separation optics $22_i$. According to embodiments, the separation optics has a thicker implementation in a central region of the separation optics compared to outer regions of the separation optics to provide a comparatively larger transit time shift such that a transit time difference is small within the sub-regions 42 and/or across the separation optics, such as with a deviation of at most 50%, at most 20% or at most 10%. If the transit time difference is used for an OOK signal, it may be advantageous to implement a small deviation or relative difference, such as at most 20%, at most 15% or at most 10% or less, to avoid transmission errors. Using other types of modulation, such as with multiple frequency carriers, can provide more resilient systems that allow for greater tolerances on the transit time differences. Alternatively or additionally, the transit time difference of the beams 48 may be compensated completely or partly by different materials used in different regions of the separation optics.

FIG. 3c shows a schematic side sectional view of a communication node $30_3$, which comprises an element 43 for transit time difference compensation. The element 43 may be dimensioned as a function of a wavelength of the optical signal, a length of the path of one or more beams 48 or their differences so that a propagation delay may be location-dependent and variable over a course of the element 43. For example, a spherical body may be provided for this purpose in the case of a spherical propagation of the beams 48, such as a hemisphere or the like. Alternatively, however, an implementation for parts of the beams $48_{i,j}$ may be provided as described in connection with the implementation of the partial surfaces $42_{i,j}$, meaning that the element 43 may have a discontinuous surface. The dimension of the element 43 along a direction 45, such as along a beam main propagation direction, may also be based on a dimension of the separation optics $22_2$, so that the desired transit time compensation is obtained, for example, combinatorially from the traversal of the element 43 and the separation optics $22_2$ or another separation optics. It also follows from this that the compensation can be achieved without the element 43 by an appropriate implementation of the separation optics, which can lead, for example, in the direction of a body according to FIG. 3a. This means that the element 43 may be arranged to at least partially compensate for the transit time difference of beams 48 between the optical transmitter 16 and the separation optics by different travel times within the element 43. The element may also be configured as a plurality of sub-elements which combinatorially provide the desired transit time correction. Although the element 43 is shown as being arranged between the separation optics $22_2$ and the transmitter 16, the element 43 may alternatively or additionally be arranged completely or partly such that the separation optics $22_2$ is arranged between the element 43 and the transmitter 16. The concept described is easily transferable to other communication nodes.

Embodiments further provide for the compensation of the transit time difference to be performed completely or partly at the receiver, for example by adapting the receiver optics and/or by using an element 43. For this purpose, an imaging implementation of the receiver optics is used so that the individual partial signals $18_i$ are separated again.

The second portion of the transit time relates to the partial signals $18i$ with i=a, b, c and may vary with the specific arrangement of the receiver 25 with respect to the transmitter 20. For example, the transit time difference may be greatest when the receiver is arranged at an edge of the field of view of the transmitter, i.e. at maximum offset of the receiver 25 with respect to transmitter 20, as rays from a first edge of the separation optics 22 to the receiver have the shortest path and those rays from the opposite, second edge of the separation optics 22 have a longer or longest path. According to embodiments, this second portion may be reduced by generating the optical partial signals $18_i$ such that they each illuminate only a portion of the field of view. In this configuration, it can be achieved that not all partial signals $18i$ impinge at the edge of the field of view, and the maximum transit time difference between the partial signals arriving at the location of the receiver can be reduced.

Both portions may also be reduced by reducing the dimension of the separation optics 22 with respect to the maximum allowable transit time difference. The maximum allowable transit time difference may result from the modulation type and the data rate. For an OOK modulated signal with a baud rate of 10 Gbits/s, the maximum allowable transit time difference could be 3 mm. A simple numerical example, which uses the length ratios on right-angled triangles, is intended to convey the order of magnitude as an example:

An emission angle of 20° at a lens distance of 100 mm results in a lens diameter of 72 mm and, with negligible lens thickness and without transit time compensation, in a path difference of 6.4 mm. By reducing the distance to 30 mm, the lens diameter is reduced to about 22 mm and the path difference to only 1.9 mm.

A compromise can be made between signal quality (in terms of the transit time difference) and eye safety since a reduction in the size of the separation optics can result, for example, in an increase in a spatial density of the focal points. With reference to the communication system 200 or 200', the receiver can be implemented and set up such that a transit time difference between incoming partial signals $18_i$ is small, for example with a deviation of at most 50%, at most 20% or at most 10% or less, as explained above, at a location of the receiver 25 or its receiving optics 24, possibly also at any location of the field of view.

Measures for reducing the first portion and for reducing the second portion of the transit time differences may be used individually or in combination. A use of an additional element 43, but also combinatorial with the separation optics, can be made using suitable materials, ordinary materials being of advantage. For example, ordinary plastic glass (such as PMMA, polycarbonate, . . . ; with refractive indices n of, for example, 1.4<n<1.8) may be used. Alternatively or additionally, mineral glass (such as BK-7, . . . , with refractive indices of, for example, 1.4<n<1.8) may be used. If a transmissive element is used, it may have a low absorption; if the element 43 and/or the separation optics is reflective, it may advantageously have a high reflectance.

Figure 4A:
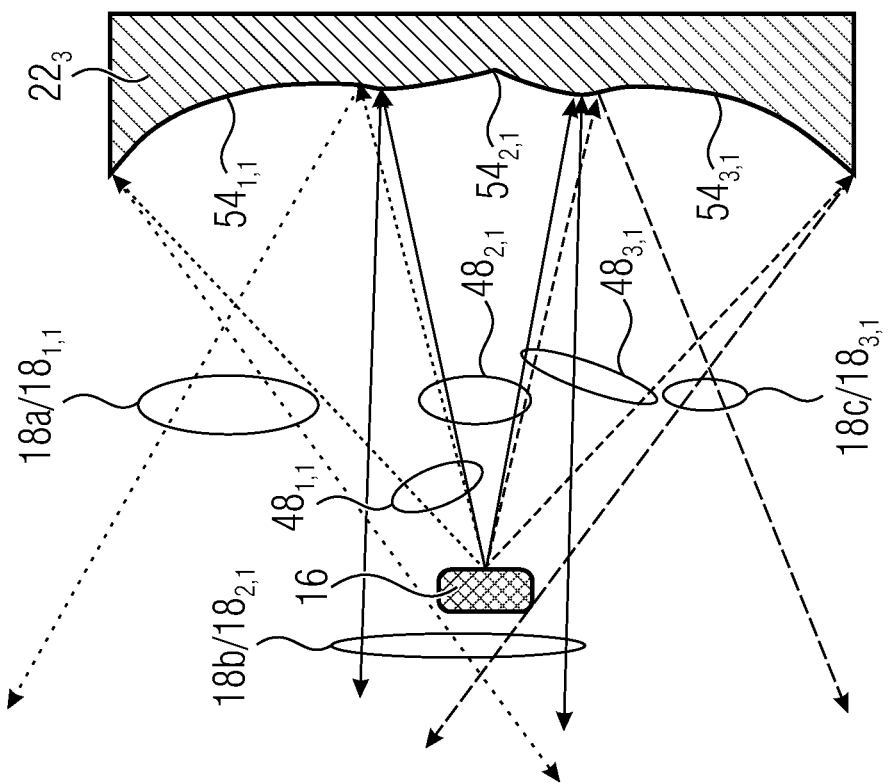
FIG. 4a shows a schematic side sectional view of a part of a communication node according to an embodiment with separation optics that is formed to be at least partially reflectively.

FIG. 4a shows a schematic side sectional view of a portion of a communication node according to an embodiment with separation optics $22_3$, which is formed to be at least partially reflective or totally reflective compared to the separation optics of FIG. 1, FIG. 2a, FIG. 2b, FIG. 3a and FIG. 3b. Optically effective surfaces $54_{i,j}$ may be designed and shaped based on the same or complementary considerations or designs, wherein the reflective properties of the optically effective surfaces 54 may be utilized instead of refractive properties. Embodiments provide for combining optically refractive and optically reflective or totally reflective surfaces in separation optics. Thus, at least one of the optically active surfaces may be formed to be reflective or totally reflective and/or at least one of the optically active surfaces may be formed to be refractive. In a configuration where the separation optics comprises at least one reflective or totally reflective surface, the optical transmitter 16 may be configured to emit the optical signal 18 towards the separation optics $22_3$. The separation optics $22_3$ may be configured to reflect or generate in the course of reflection the plurality of optical partial signals. Effects of a reduced power of the optical signal at the receiver, which may be obtained by shadowing by the optical transmitter 16, may be at least mitigated by a suitable selection of a shape and/or position of the optical transmitter 16. In the configuration shown in FIG. 4a, the optical transmitter 16 is arranged opposite the separation optics $22_3$ and the separation optics $22_3$ can be used as a reflector.

Figure 4B:
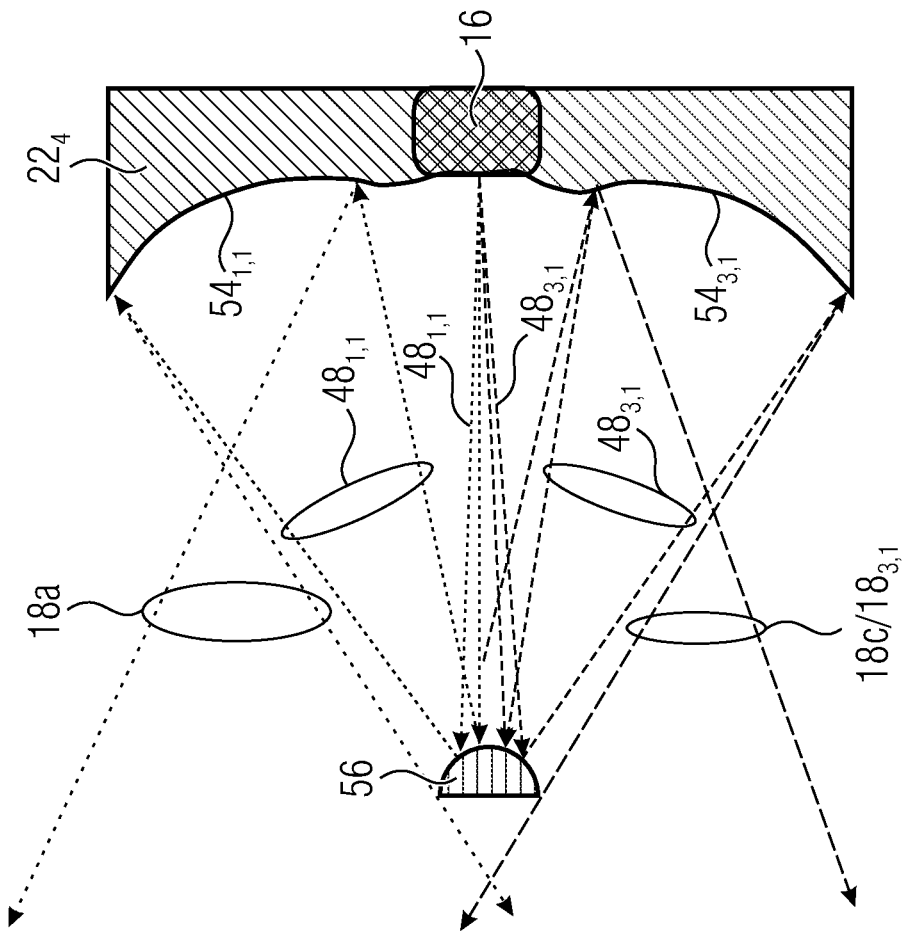
FIG. 4b shows a schematic side sectional view of a part of a communication node according to an embodiment in which separation optics is also formed to be reflective, and in which an optical transmitter is arranged in a plane of the separation optics.

FIG. 4b shows a schematic side sectional view of a part of a communication node according to an embodiment in which separation optics $22_4$ also comprises one, more or all of the optically effective surfaces 54, which may be formed as reflective or totally reflective surfaces. Unlike FIG. 4a, the optical transmitter 16 may be arranged in a plane of the separation optics $22_4$. A sub-reflector 56 may be arranged to receive the optical signal 18 and reflect it back to the separation optics $22_4$ by means of reflection. Provision may be made to exclude a region in which the optical transmitter 16 is arranged in the plane of the separation optics $22_4$ from being split into the optical partial rays so that, for example, one of the optically effective surfaces of the separation optics $22_3$ of a comparative configuration would be used for the function of emitting the optical signal. However, it is also possible to use partially transparent surfaces and to provide one of them as an optically effective surface between the optical transmitter 16 and the sub-reflector 56 so that the radiation reflected by the sub-reflector 56 is also refracted in the region of the optical transmitter 16 in a manner analogous to an optically effective surface $54_{1,1}$ or $54_{3,1}$. Similarly, a surface of the sub-reflector 56 may be implemented such that splitting into the beams occurs at least partially at that location.

Since sub-reflectors 56 may be shaped or formed to be locally smaller than the optical transmitter 16, an effect of shadowing may be reduced by using a sub-reflector 56. While in the configuration according to FIG. 4a, the transmitter 16 is configured to directly emit the optical signal towards the separation optics $22_3$, in the configuration according to FIG. 4b the transmitter 16 is configured to indirectly emit the optical signal towards the separation optics $22_4$ by means of the sub-reflector 56. The separation optics $22_3$ and $22_4$ are configured to reflect the plurality of optical partial signals $18_i$.

In other words, the separation optics may also be based on reflection, as shown in FIGS. 4a and 4b. The configuration according to FIG. 4a shows a system in which the separation optics are completely reflective with respect to the communication wavelength. The modulated signal 18 emitted by transmitter 16 may be separated into a plurality of beams $48_{i,j}$, analogously to the refractive optics. Each beam $48_{i,j}$ impinges on a differently shaped surface element $54_{i,j}$ of optics $22_3$ and is accordingly reflected differently such that the beams $18_{i,j}$ cover all or part of the field of view. A sum of the beams $48_{i,j}$ corresponds to the beam 26.

In the system illustrated in FIG. 4a, the surface elements $54_{i,j}$ are implemented such that the edge rays of each element cross. However, the surface may also be shaped such that they do not cross, and other solutions are possible for different combinations of optically effective surfaces. A disadvantage may arise from the fact that the transmitter 16 blocks part of the rays $18_{i,j}$. To reduce this effect, the central part, for example the optically effective surface $54_{2,1}$, may be shaped accordingly, for example by directing a small amount of light power into the blocked area. In addition, the shadowing effect may be further minimized, such as by the implementation shown in FIG. 4b. FIG. 4b shows a system in which the separation optics $22_4$ is reflective with respect to the communication wavelength. The transmitter 16 emits the modulated signal 18 in the communication direction. A reflector 56 is located in front of it, which reflects the partial rays $48_{i,j}$ in the form of the beams $18_{i,j}$. The surface elements of the optics shape the field of view in the form of the rays reflected back from the separation optics $22_4$. In this respect, FIGS. 4a and 4b show schematic representations of exemplary implementation of the separation optics using reflection. All the elements are understood to be three-dimensional bodies, which are generally not rotationally symmetrical.

Figure 5A:
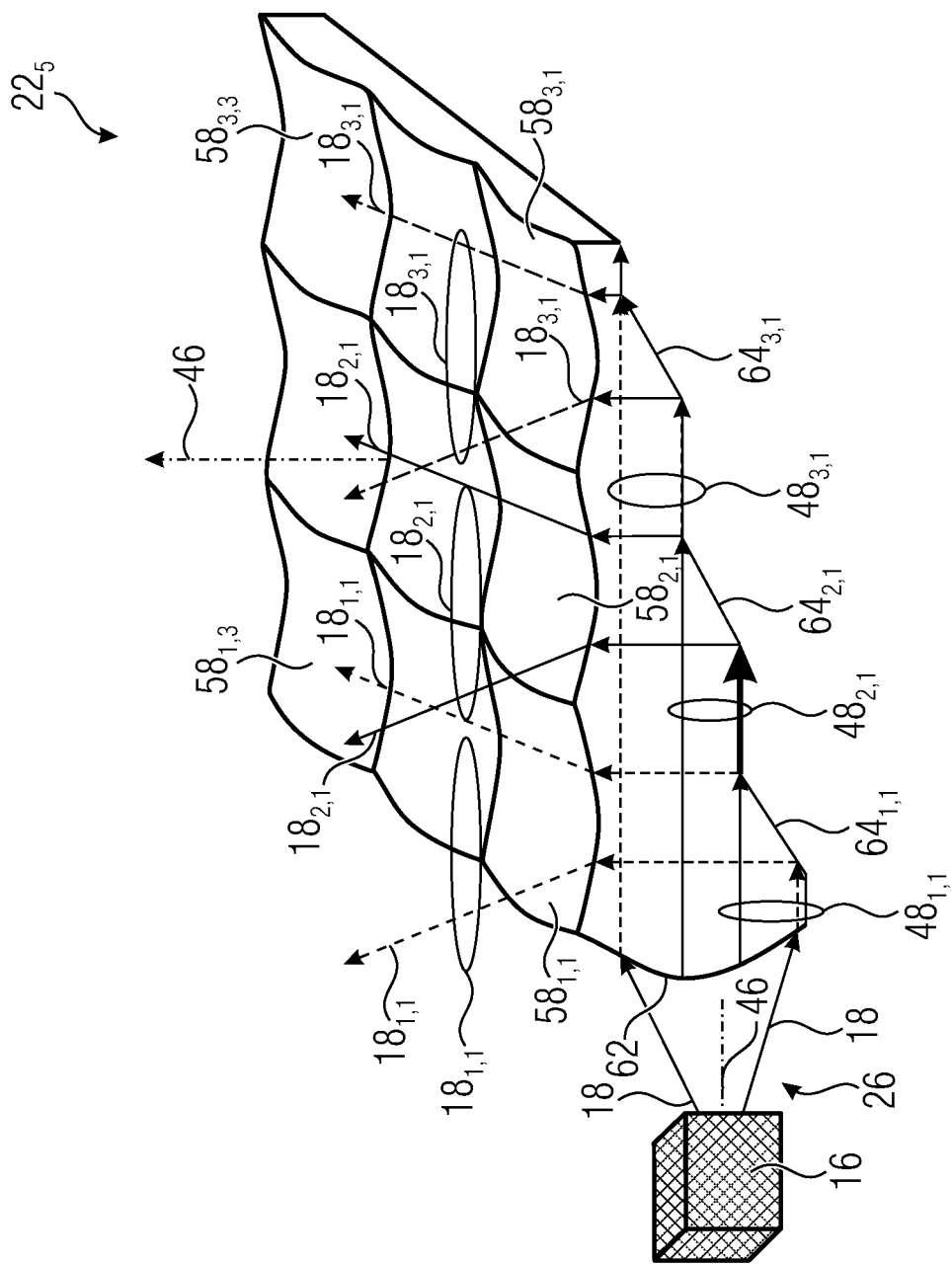
FIG. 5a-b show schematic illustrations of separation optics according to embodiments comprising totally reflective surfaces.
Figure 5B:
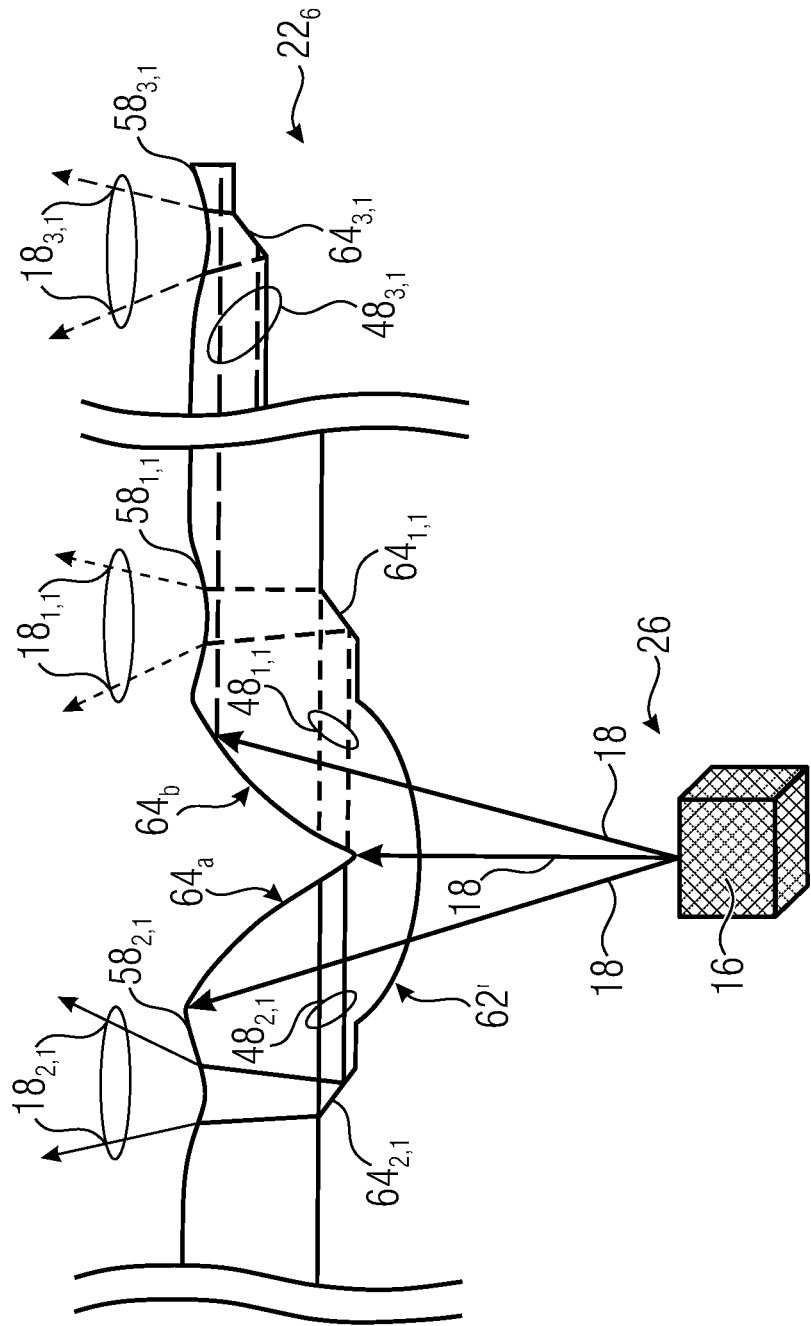

While the configurations according to FIGS. 4a and 4b are based on reflection, the configurations according to FIGS. 5a and 5b can also use totally reflecting surfaces. As described for the preceding separation optics, separation optics may also have a plurality of optically active surfaces, each of which is associated with one of the optical partial signals. Similarly, each of the optically effective surfaces may have an individual geometry and/or area size adapted to a relative position between the optically effective surface and the optical transmitter 16. The different optically active surfaces of separation optics described herein may have a different size and/or different aspect ratio of their sides of the optically active surface.

At least one of the optically effective surfaces of separation optics described herein may be formed to have no symmetry. This symmetry-free implementation allows for highly accurate adaptation of the separation optics to the emission profile of the transmitter 16, the transmission path, and/or the receiver optics.

FIG. 5a shows a sectional perspective view of an optical transmitter 16 together with separation optic $22_5$ according to an embodiment. The separation optics $22_5$ has an N×M field of optically effective surfaces $58_{i,j}$, exemplary N and M being selected to equal 3. The separation optics $22_5$ comprises a lateral surface 62 configured to receive the optical signal 18. For example, an orientation of the lateral surface 62 may be substantially perpendicular to an emission direction along which the optical partial signals $18_{i,j}$ are emitted. In principle, any orientation with respect to one another is possible since the separation optics 22 comprises additional reflective surfaces $64_{i,j}$ configured to redirect the beams $48_{i,j}$ by means of total reflection and to direct them to the respective associated optically effective surface $58_{i,j}$. This allows both the orientation of the transmitter 16 with respect to the separation optics $22_5$ and an orientation of the lateral surface 62, as well as an angle of incidence of the reflective surfaces $64_{i,j}$ with respect to the lateral surface 62 or the transmitter 16 to be added later, to be freely selectable and be implemented to be combinatorial among one another. The lateral surface 62 can have optically effective properties, for example collimating or such that the corresponding parts of the optical signal 18 are directed onto the reflecting surfaces $64_{i,j}$.

The optically effective surfaces $58_{i,j}$ can be implemented such that they provide, for example, a divergent or even scattering effect for the respective incident beam $48_{i,j}$.

The separation optics $22_5$ is configured to redirect the optical signal 18 in another direction by means of total reflection or reflection at at least one reflective or totally reflective surface 64. Each optically effective surface $58_{i,j}$ is unambiguously associated with a sub-region of the at least one reflective or totally reflective surface 64. Thus, separation optics can be formed in such a way that multiple reflection occurs. This, and alternatively or additionally the use of an optically effective lateral surface, enables multiple directional deflection by the separation optics $22_5$.

The separation optics $22_5$ here may also be shaped such that the plurality of optically effective surfaces $58_{i,j}$ are shaped to have a different area size and/or different aspect ratio with respect to at least one other surface element. For example, an implementation may be such that an area size increases with a distance from an optical axis of the optical transmitter 16. Broadly speaking, the optical axis of the optical transmitter 16 may also be assumed to be reflected or deflected such that it may extend, for example, in a central area element of the separation optics $22_5$, such as by having the center point 44 of FIG. 3a extend through that area element.

This implementation may be based on the idea that a radiation power of the optical transmitter 16 is high near the optical axis and decreases towards edge regions. Thus, by an increasing area size with an increasing distance from the optical axis, it can still be ensured that an, at least within tolerance ranges, equal portion of the radiation power of the transmitter 16 passes through each area element $58_{i,j}$. For example, the transmitter 16 may be configured to provide an intensity maximum in the optical signal 18 in a region comprising the optical axis 46. Separation optics described herein having different area sizes from one another may be configured to provide, based on the different area size, an optical power per optically effective surface that is equal within a tolerance range of 50%, advantageously 30%, and more advantageously 10%.

FIG. 5b shows a schematic side sectional view of separation optics $22_6$ according to an embodiment, which may be used, as is the case with the separation optics $22_5$, in the communication node according to embodiments described herein.

The optical signal 18 can be deflected by means of one or more reflecting surfaces 64a and/or 64b, whereby from this reflected light at locally different areas a deflection to the respective optically effective surfaces $58_{i,j}$ can be effected again by means of the reflecting surfaces $64_{i,j}$, wherein at least one or a group of reflecting surfaces $64_{i,j}$ can be associated with another reflecting surface 64a or 64b and each of the optically effective surfaces $58_{i,j}$ can be associated with a reflecting surface $64_{i,j}$. Likewise, each of the reflecting surfaces $64_{i,j}$ may be associated with a partial surface area of the surfaces 64a or 64b, which makes it possible, in particular by collimation or parallel beam guidance of the optical signal in the region between the surfaces 64a or 64b and the associated reflecting surfaces $64_{i,j}$, to provide a type of step profile in which a part of the signal is coupled out by means of a step in the region of the reflecting surface $64_{i,j}$. This enables a particularly efficient two-dimensional distribution of the light signal. However, the term "step" is not limited to right angles, but can have any angle of incidence, for example 45°±30°, ±20° or ±10° with respect to the arrival of the signals. By means of the double reflection, a changed relative position of the transmitter 16 with respect to the separation optics 22 can be obtained when a comparison is made between the separation optics $22_5$ and $22_6$.

In other words, the separation optics may employ total reflection, as shown in FIGS. 5a and 5b. FIG. 5a shows that separation optics $22_5$ first collimates the modulated signal 18 emitted by the transmitter 16 by means of refraction at the lateral surface 62. The collimated beams are designated by 48$_{i,j}$. These beams are directed towards the communication at the corresponding surfaces 64$_{i,j}$. Upon exiting the optics or separation optics 22$_5$, the rays are refracted at the free-form surfaces 58$_{i,j}$ to yield the anticipated field of view with the anticipated irradiance. These output rays are designated by 18$_{i,j}$. In contrast, although the configuration shown in FIG. 5b is similar to the configuration as in FIG. 5a, the modulated signal 18 may here be collimated by the totally reflective surfaces 64a and 64b of the separation optics 22$_6$. The input surface 62' may be optically inactive or may contribute to beam shaping. The collimated partial rays leaving the surfaces 64a or 64b, designated by 48$_{i,j}$, may be directed through the surfaces 64$_{i,j}$ in the direction of communication and refracted at the surface elements 58$_{i,j}$ such that the anticipated field of view is produced with the appropriate irradiance. The output rays are designated by 18$_{i,j}$. That means that FIGS. 5a and 5b show schematic representations of exemplary embodiments of the separation optics using, among other things, total reflection. All the elements are understood to be three-dimensional bodies, which are generally not rotationally symmetrical.

The configuration according to FIG. 5b also illustrates that the exit surface of the separation optics need not be completely or totally filled by the free-form surface elements 58$_{i,j}$. It is also possible to further distribute the corresponding surface elements over the exit surface. This allows optically differently used or optically inactive intermediate regions between the sub-regions. Although this increases the size of the separation optics, it also increases the extension of the apparent source, i.e. the spacing of the focal points of the individual sub-rays when focused together so that the threshold value for the power emittable by the transmitter increases in the light of eye safety.

Aspects described herein relate to a concept with a transmitter comprising or including a modulator, emitter and separation optics. The latter is characterized in that the optical modulated signal is separated into sub-rays, of which each beam is associated with a part of the separation optics. This optics part transforms each beam into the desired output ray profile by refraction, reflection and/or total reflection, with the aim of increasing the apparent extension of the source and possibly additionally the output cross-section so as to increase the threshold value for the permissible radiation according to DIN EN 60825-1:2015-07.

Figure 6:
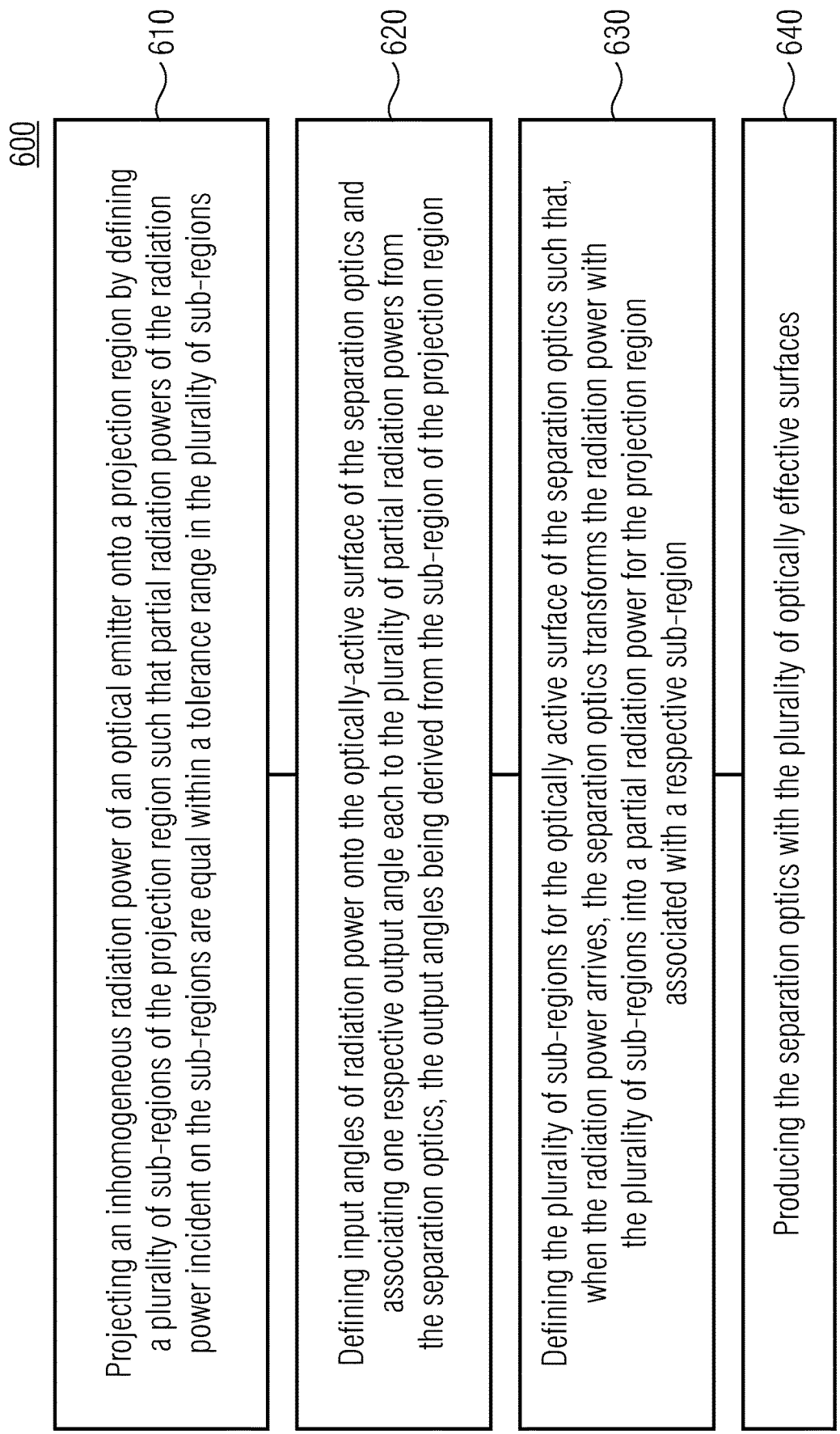
FIG. 6 shows a schematic flow chart of a method of providing separation optics in accordance with embodiments described herein.

FIG. 6 illustrates a schematic flow chart of a method 600 of providing separation optics in accordance with embodiments described herein. Such separation optics may be used for an optical-wireless communication node and may include a plurality or multitude of optically active surfaces. For each of the optically active surfaces, such as surfaces 54$_{i,j}$ and/or 58$_{i,j}$, the following steps may be performed. In step 610, an inhomogeneous radiation power of an optical emitter is projected onto a projection region by defining a plurality of sub-regions of the projection region such that partial radiation powers of the radiation power incident on the sub-region are equal within a tolerance range in the plurality of sub-regions. This means that the spatial distribution of the radiation power can be divided into sub-regions whose area integral with respect to the radiation power is equal within the tolerance range.

In step 620, input angles of the radiation power onto the optically active surface of the separation optics are defined and a respective output angle each is associated to the plurality of partial radiation powers from the separation optics, wherein these output angles are derived from the sub-region of the projection region. Making exemplary reference to FIGS. 3a and 3b, it is thus possible to take into account, for example, the angle at which the optical signal 18 impinges on the surface 52 or 52' and the angle at which the beam is to be output, or how it is to be fanned out.

In step 630, the plurality of sub-regions is defined for the separation optics, that is the plurality of optically active surfaces, such that when the radiation power arrives, the separation optics transforms the radiation power with the plurality of optically effective surfaces into a partial radiation power for the projection area associated with a respective sub-region. That is, for each of the optically active surfaces, a plurality or multitude of individual rays in a respective sub-beam 48 is assumed and, for each of these individual rays in the beams, a separate dedicated sub-surface region of the optically active surface is determined, for example by means of computer simulation or calculation. This may result in the aforementioned free-forms, as differently inclined, shaped, differently sized or otherwise different sub-surfaces within a surface element may be obtained hereby, which are then combined to form a surface of the optically active surfaces 48$_{i,j}$. The higher a number of assumed or considered rays within one of the beams 48$_{i,j}$, the higher the number of partial surface elements.

Also, with respect to these assumed partial surfaces of a single optically active surface, the partial radiation from the beam can be implemented to be the same or the same within a tolerance range. In other words, each of the optically active surfaces described in the figures shown herein is formed from a plurality or multitude of partial surfaces specifically designed, configured and assembled into the respective optically active surfaces.

In step 640, the separation optics with the plurality of optically effective surfaces is produced.

The communication nodes described herein can have a field of view which may depend on the field of application. Depending on the distance to be bridged, the field of view may be between 1° and 50°, advantageously between 3° and 30°, and particularly advantageously between 5° and 20° with respect to the direction of view of the communication node. Thus, the shape of the field of view (such as circular cross-section, rectangular cross-section or elliptical cross-section) can be different before and after imaging optics, the separation optics.

In combination with embodiments described herein aiming at achieving an expansion of the apparent source, it is advantageous to realize a certain distance between the emitter and the lens, i.e. between the elements 16 and 22. For example, a practical distance may be in a range between 2 mm and 200 mm, advantageously between at least 5 mm and at most 100 mm or at least 8 mm and at most 50 mm. A greater distance may thereby (depending on the angle of radiation) also result in a greater lens extension. The latter is determined by the application. This can be in the sub-millimeter range, but can also be several 10 centimeters. The application of classical optics can range to spatial sizes along the longest axis, which is in a range between at least 5 mm and at most 55 mm. However, reference has been made herein only to advantageouls or standard applications. Embodiments have the advantage that an implementation to any scenario is possible. In FIGS. 4a and 4b, the eye safety can be defined by the dimension of the large mirror, i.e. the reflective separation optics, and the number of elements. In FIGS. 5a and 5b, the eye safety may be at least partially independent of the distance from the laser (element 60) to the lens (separation optics), but may be at least influenced by the area of the optics, i.e. over which area the individual surfaces are distributed into elements. The embodiments of FIGS. 5a and 5b can thus be implemented to be particularly flat.

The number of optically active surfaces can influence eye safety. The implementation of the number of surface elements, i.e. the selections of the number of elements in N and/or M can be made depending on various parameters. In this context, it may be taken into account that, compared to one-path optics, the separation optics according to embodiments generates multiple images in the imaging test setup of the eye safety standard. In order for the separation optics to fulfill its purpose particularly well, the following conditions can be observed.

The permissible threshold value of accessible radiation (TAR) of the corresponding laser class/lamp group is to be observed both for all individual sources imaging on the detector. The following applies: $P_{eye}=\text{TAR} \cdot C_6$ (explanations of the C6 value will follow). However, this also applies to the totality, i.e. the envelope, which includes all the sources. The difference to the one-path optics is as follows:

The power of each source considered individually is lower by a factor of N*M if N*M sources are assumed and these have the same partial power.

The envelope of all individual sources shows a much higher extension than the image of an individual source of one-path optics would exhibit. As a result, the allowable C6 value and thus the threshold value is increased. Thus, C6 of an individual source will be significantly smaller than the C6 of the entirety.

The number of elements depends on various parameters: manufacturing accuracy, field of view angle, size of the multi-path optics:

On the one hand, the field of view angle $\theta_{FOV}$ (FOV=Field of View) and the general size of the optics (assumption: radius $r_{optics}$) determine which part of the total radiated power $P_{emission}$ reaches the eye. The power incident on the eye can be approximated using $$P_{eye} = P_{emission}\frac{A_{eye}}{A_{FOV}(z=10\text{ cm})} = P_{emission}\frac{\pi(7\text{ mm})^2}{(r_{optics}+10\text{ cm}*\tan(\theta_{FOV}))^{\wedge}2\pi} =,$$

wherein small errors can occur here. $A_{eye}$ denotes the pupil area at maximum width and $A_{FOV}$ the area of the field of view at a distance z of 10 cm.

The extension of the apparent sources describes the effect of each source being focused on different points of the retina, and is described using C6 parameters. The following applies:

$$C_6 = \frac{\alpha}{\alpha_{min}}$$

The factor $\alpha$ can vary only between $\alpha_{min}=1.5$ mrad and $\alpha_{max}=100$ mrad (if it is smaller, it is set to 1.5 mrad, if it is larger, it is assumed to be 100 mrad). Alpha $\alpha$ is taken from the measurement setup according to the eye safety standard.

If an individual source of the plurality of sources is considered, there is a point at which, from the C6 value point of view, it is no longer worth increasing the number of area elements in order to further increase the apparent extension, or little added value is obtained from additional area elements. However, it is worthwhile from the point of view that the conduction of each source then decreases.

Typical values could be: 2*2 areas (N=M=2), 8*8 areas (N=M=8), 16*16 areas (N=M=16), 20*20 areas (N=M=20), 40*40 areas (N=M=40) or even 100*100 areas, (N=M=100) —depending on the diameter of the multi-path optics, wherein N can also be unequal to M. If, for example, the aspect ratio along both axes is not 1 (the cross-section of the beam 26 is, for example, an ellipse or a rectangle), the number of elements along the axes may also be different, for example: 2*1 faces, 2*4 faces, 8*16 faces, 20*40 faces, 40*80 faces, 100*200 faces, and so on.

The surface elements do not necessarily have to have the same spatial extension. Single-mode lasers have an intensity maximum for small or medium angles (measured relative to the optical axis). This is where most power leaves the emitter and also the optics. Contrary to the simplification made above, this results in the fact that not all the sources have the same power when evenly distributed, since the power would not be distributed evenly to all the surface elements. In the case described, the surfaces in the middle would emit above average power. It is therefore possible, within the scope of embodiments described herein, to implement the elements to be different in their spatial extension. For example, those elements in the center could be made smaller than those in the outer regions. This can be solved, for example, by an algorithm which determines the total emitted power $P_{emission}$ and divides it by the number N*M of surface elements. Now the half-space in front of the emitter is divided into N*M solid angles such that the N*M regions are each passed by the same power. The individual surface elements are constructed in this region. As a consequence, the individual sources in the measurement setup should then have approximately the same power. In this case, the lens is specifically adapted to the emitter profile since the position and size of the surface elements are then determined at least partly by the emission profile of the emitter. To distinguish the lens from gratings or other diffractive elements, it is noted herein that the mode of functioning of the optics is not attributed to interference phenomena, that is the multiple images are not obtained by interference. Therefore, separation optics described herein are readily combinable even with non-coherent sources.

Embodiments described herein may also be used for lighting applications. In this case, compliance with eye safety is also more easily maintained. Embodiments relate to optical-wireless communication, but may also be applied in the field of LIDAR and/or gesture recognition, where the average transmission power may be increased compared to known applications by means of embodiments described herein due to less critical eye safety. This may mean that the time interval between LIDAR pulses (with equal pulse duration) may be reduced, allowing the environment to be scanned more quickly. Alternatively or additionally, the transmission power may be increased, for example to increase the range. Embodiments further enable complex light distribution. The free-form optics reshape the emitter ray profile into another one, for example the logo of a brand or other desired shapes. With these separation optics, higher power can be used to achieve higher ranges, at the same time with more uncritical eye safety. Embodiments may further be used in measuring devices where lasers are used, but where the risk to the eye is to be reduced. For example, because a person taking measurements is to be present in the measurement region.

Further embodiments may be easily employed in the context of industrial production.

Embodiments describe a high-power transmitter for optical-wireless communication, which consists of or at least comprises a modulator, emitter (laser) and separation optics, wherein the separation optics allows maintaining eye safety despite high transmission power (about several 100 milliwatts on average). The higher transmission power makes it possible to improve the link budget, i.e. to increase range, coverage and data rate. The special multi-path lens separates the emitted signal into several sub-rays by means of refraction, reflection and/or total reflection and simultaneously adapts each of the beams to the anticipated field of view. The lens is transparent or specular in the spectral range of communication (possibly outside illumination), which means that it has the lowest possible absorption there.

In the classification according to DIN EN 60825-1:2015-07 [3], the source is imaged onto a detector by means of a spherical lens to determine the laser class of a laser. Since the beam emitted by the emitter has a low Étendue (colloquially a low disorder), it can be focused onto a particularly small point so that the angular extension of the source is very small and the permissible threshold value for the emitter is accordingly very low. In order to be able to, or to be allowed to, use as high a transmitting power as possible, separation optics are used in embodiments so as to increase the permissible threshold value by increasing the angular extension of the source. It is difficult or impossible for the simple spherical lens in the classification structure, and analogously for the human eye, to focus the individual beam onto a single point. Instead, multiple focal points result.

The embodiments described herein of separation optics of the high-power transmitter comprise a plurality of optical elements, and differ from the prior art cited above in the following respects:

Every single element of the optics is a freeform and is calculated analytically (e.g. by raymapping, simultaneous multiple surface method, solution of the Monge-Ampere equation, or comparable methods) or numerically so that it is adapted to the field of view, which means: a large part (ideally: all) of the emitted power is directed into the field of view. In the target field, the anticipated irradiance (e.g. constant within a plane perpendicular to the optical axis) then results.

Compared to approach [2], this separation optics allows a higher output power.

Compared to approach [1], this separation optics allows a higher data rate.

Compared to approach [3], this separation optics enables a higher efficiency.

Compared to approach [4], this separation optics consists of a smaller number of individual elements, which were calculated individually and would also function individually. An additional collimator lens is not necessary. Furthermore, the lens can specifically reduce transit time differences of the signal between the center and the edge by (a) varying the thickness between the center and the edge accordingly and (b) not having each of the area elements illuminate the entire field of view, as described above.

In contrast to approach [5], the free-forms allow almost any output profile so that an output profile with a smaller angular extension than that of the emitter is also possible; in addition, the free-forms allow a very "sharp" field of view edge, i.e. the irradiance drops rapidly there. The latter reduces inter-channel crosstalk and increases the dynamic range of the link. Furthermore, the lens can specifically reduce transit time differences of the signal between the center and the edge by (a) varying the thickness between the center and the edge accordingly and (b) not having each of the area elements illuminate the entire field of view, as described above.

Since the optics elements are free-forms, they are matched to the source. Although each element may illuminate the same target field, all the elements are to be shaped differently because the relative position of each optic element to the source is different.

In contrast to approach [4], no collimator lens is required; since only a single element is needed, material and assembly costs are reduced.

In contrast to approach [4], the structure is different at each part of the optics; in approach [4], the "disorder" of the scattering elements is distributed uniformly over the entire optics.

In contrast to approach [5], no collimator lens is required; since only a single element is needed, material and assembly costs are reduced.

In contrast to approach [6], a single laser source can be used.

The separation optics can be manufactured in large quantities at low cost, for example by injection molding. The tool or individual prototypes are formed using ultra-precision turning or ultra-precision machining.

Compared to [4], a significantly more cost-effective production is possible.

Depending on the design, the optical elements of the separation optics can be implemented such that each illuminates the entire field of view. This redundancy increases the reliability of the communication link since not a single part of the field of view is completely shadowed, but only the average irradiance within the field of view is reduced.

The separation optics works with a single emitter

In contrast to [6], only a single emitter is used; in [6], a VCSEL array is used in the source; this array is combined with a microlens array. Embodiments also differ in that the microlens array is used for tolerance correction (Köhler integration) and all elements of the microlens array are therefore of the same design, in contrast to the embodiments described herein.

The permissible output power of the emitter is not unlimited, even with multi-path optics. It results from the number of optical elements, the spatial dimensions of the optics and non-ideal scattering. The scattering occurs at the regions between the optical elements. Here, there is typically rounding (with radii in the range of a few to a few hundred micrometers).

In the following, additional embodiments and aspects of the invention will be described which can be used individually or in combination with any of the features and functionalities and details described herein.

According to a first aspect, a communication node configured for optical-wireless communication in an optical wireless communication network may have: an input interface 12 configured to receive a data signal 14; an optical transmitter 16 configured to convert the data signal 14 into an optical signal 18 having an optical power; separation optics 22 configured to spatially divide the optical signal 18 into a plurality of optical partial signals 18a-c having an associated spectral range to divide the optical power onto the plurality of optical partial signals 18a-c, the plurality of spectral ranges at least partially coinciding; wherein the communication node is configured to emit the plurality of optical partial signals 18a-c for the optical-wireless communication.

According to a second aspect when referring back to the first aspect, the optical transmitter 16 may be configured to provide the optical signal 18 with a communication wavelength, the separation optics 22 being formed to be low in absorption for the communication wavelength.

According to a third aspect when referring back to the first or second aspect, the separation optics 22 may be configured to divide a beam of the optical transmitter 16 into a plurality of sub-beams, each sub-beam providing an optical partial signal, the plurality of sub-beams being configured to form a total field of view of the communication node.

According to a fourth aspect when referring back to any of the first to third aspects, the separation optics may be configured to at least partly compensate for a transit time difference of beams 48 between the optical transmitter 16 and the separation optics due to different transit times within the separation optics 22; or wherein an element 43 is arranged to at least partly compensate for a transit time difference of beams 48 between the optical transmitter 16 and the separation optics due to different transit times within the element 43.

According to a fifth aspect when referring back to any of the first to fourth aspects, the communication node may be configured such that, in a region of a field of view of the communication node, a transit time difference of incoming partial signals has a deviation of at most 50% from one another.

According to a sixth aspect when referring back to any of the first to fifth aspects, the plurality of optical partial signals 18a-c may be focused at spatially disjoint locations of an image plane when focused together.

According to a seventh aspect when referring back to the sixth aspect, a spacing of focal points may be obtained with focusing together, the radiated power of which are each below a limit defined according to DIN EN 60825-1 or IEC 60825-1:2014 and in total exceed this limit.

According to an eighth aspect when referring back to any of the first to seventh aspects, the separation optics 22 may comprise a plurality of optically active surfaces, each of which is associated with one of the optical partial signals.

According to a ninth aspect when referring back to the eighth aspect, each of the optically effective surfaces may have an individual geometry and/or an individual area size adapted to a relative position between the optically effective surface and the optical transmitter 16.

According to a tenth aspect when referring back to the eighth or ninth aspect, optically effective surfaces of the plurality of optically effective surfaces may have a different size and/or different aspect ratio of their sides of the optically effective surface.

According to an eleventh aspect when referring back to any of the eighth to tenth aspects, the separation optics 22 may have an N×M field having a number of N≥1 and M≥1 with at least one of N and M≥2 optically effective surfaces.

According to a twelfth aspect when referring back to any of the eighth to eleventh aspects, at least one of the optically effective surfaces may have no symmetry.

According to a thirteenth aspect when referring back to any of the eighth to twelfth aspects, the separation optics 22 may be configured to redirect the optical signal 18 in another direction by means of total reflection at at least one reflective or totally reflective surface, each optically effective surface being unambiguously associated with a partial region of the at least one reflective or totally reflective surface.

According to a fourteenth aspect when referring back to the thirteenth aspect, the separation optics 22 may be configured to perform multiple directional deflection.

According to a fifteenth aspect when referring back to the thirteenth or fourteenth aspect, the plurality of optically effective surfaces may have a different area size which increases with an increasing distance from an optical axis of the optical transmitter 16.

According to a sixteenth aspect when referring back to the fifteenth aspect, the optical transmitter 16 may be configured to provide an intensity maximum in the optical signal in a region comprising the optical axis, wherein the separation optics 22 is configured to provide an optical power per optically effective surface which is equal within a tolerance range of 50%, preferably 30%, based on the different area size.

According to a seventeenth aspect when referring back to any of the eighth to sixteenth aspects, at least one of the optically effective surfaces may be formed as a partial lens configured to refract an associated part of the optical signal.

According to an eighteenth aspect when referring back to any of the eighth to sixteenth aspects, at least one of the optically effective surfaces may be formed to be reflective or totally reflective.

According to a nineteenth aspect when referring back to the eighteenth aspect, the optical transmitter 16 may be configured to emit the optical signal 18 towards the separation optics 22; wherein the separation optics 22 may be configured to reflect the plurality of optical partial signals 18a-c.

According to a twentieth aspect when referring back to the tenth aspect, the communication node may comprise a sub-reflector arranged opposite the separation optics 22 and may be configured to receive the optical signal 18 from the optical transmitter 16 and to reflect it back to the separation optics 22.

According to a twenty-first aspect when referring back to the twentieth aspect, the optical transmitter 16 may be arranged in a plane of the separation optics 22.

According to a twenty-second aspect when referring back to any of the first to twenty-first aspects, the communication node may be configured to generate the plurality of optical partial signals 18a-c with matching data information.

According to a twenty-third aspect when referring back to any of the first to twenty-second aspects, a center of the separation optics 22 may be arranged on an optical axis 46 of the optical transmitter 16.

According to a twenty-fourth aspect when referring back to any of the first to twenty-second aspects, a center of the separation optics 22 may be arranged off an optical axis 46 of the optical transmitter 16.

According to a twenty-fifth aspect when referring back to any of the first to twenty-fourth aspects, the separation optics 22 may be arranged to receive at least 90% of a radiation power emitted by the optical transmitter 16.

According to a twenty-sixth aspect when referring back to any of the first to twenty-fifth aspects, an optical signal power of the optical signal 18 without the separation optics 22 may exceed an eye safety for the human eye and the plurality of optical partial signals 18a-c in sum may maintain the eye safety.

According to a twenty-seventh aspect when referring back to any of the first to twenty-sixth aspects, the separation optics 22 may be configured to produce a multiple image of the optical signal of the transmitter 16.

According to a twenty-eighth aspect when referring back to any of the first to twenty-seventh aspects, each optical partial signal may be adapted to a common total field of view of the plurality of optical partial signals 18a-c.

According to a twenty-ninth aspect when referring back to any of the first to twenty-eighth aspects, the communication node may be formed without a collimator lens in an optical path starting from the optical transmitter 16.

According to a thirtieth aspect when referring back to any of the first to twenty-ninth aspects, the optical transmitter 16 may comprise a laser.

According to a thirty-first aspect when referring back to any of the first to thirtieth aspects, the communication node may be configured to receive and process the data signal 14 as a broadband or narrowband modulated data signal 14.

According to a thirty-second aspect when referring back to any of the first to thirty-first aspects, the optical transmitter 16 may have a modulating radiation source; or the optical transmitter 16 may have an optical emitter 36 for providing a first optical signal and a modulator 38 configured to receive and modulate the first optical signal 18' so as to provide the modulated optical signal 18.

According to a thirty-third aspect when referring back to the thirty-second aspect, the optical transmitter 16 may have the modulator 38, the modulator 38 being configured to modulate the first optical signal based on current control and in the form of an intensity modulation and/or polarization modulation.

According to a thirty-fourth aspect when referring back to any of the first to thirty-third aspects, the communication node may be configured to emit the optical signal 18 in a wavelength range visible to the human eye, and to provide illumination of an environment of the communication node with the wireless optical signal.

According to a thirty-fifth aspect when referring back to any of the first to thirty-fourth aspects, the communication node may be configured for transmitting and receiving wireless optical signals.

According to a thirty-sixth aspect, an optical-wireless transmission system may have: a communication node according to any of first to thirty-fifth aspects; and a receiver 25 configured to receive at least a portion of the plurality of partial signals 18a-c; wherein a field of view of the communication node is adapted to receiving optics of the receiver.

According to a thirty-seventh aspect when referring back to the thirty-sixth aspect, the receiver may be arranged such that the receiving optics receives at least at 70% of an area portion of a total field of view of the communication node.

According to a thirty-eighth aspect, in a method of providing separation optics for an optical-wireless communication node having a plurality of optically active surfaces, the following steps may be performed for each of the optically active surfaces: projecting 610 an inhomogeneous radiation power of an optical emitter onto a projection region by defining a plurality of sub-regions of the projection region such that partial radiation powers of the radiation power incident on the sub-regions are equal within a tolerance range in the plurality of sub-regions; defining 620 input angles of radiation power onto the optically active area of the separation optics and associating a respective output angle each to the plurality of partial radiation powers from the separation optics, the output angles being derived from the sub-region of the projection region; defining 630 the plurality of sub-regions for the optically active surface of the separation optics such that, when the radiation power arrives, the separation optics transforms the radiation power with the plurality of sub-regions into a partial radiation power for the projection area associated with a respective sub-region; and producing 640 the separation optics having the plurality of optically effective surfaces.

According to a thirty-ninth aspect when referring back to the thirty-eighth aspect, projecting 610 may be performed taking into account the inhomogeneous distribution as a three-dimensional inhomogeneous optical light power.

Although some aspects have been described in relation to a device, it is understood that these aspects also represent a description of the corresponding method so that a block or component of a device is also to be understood to be a corresponding method step or feature of a method step. In analogy, aspects described in connection with or as a method step also represent a description of a corresponding block or detail or feature of a corresponding device.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LITERATURE

[1] F. Zafar, M. Bakaul and R. Parthiban, "Laser-Diode-Based Visible Light Communication: Toward Gigabit Class Communication," in IEEE Communications Magazine, vol. 55, no. 2, pp. 144-151, February 2017.
[2] E. Säckinger. Analysis and Design of Transimpedance Amplifiers for Optical Receivers. JohnWiley and Sons, 2018.
[3] Standard. DIN EN 60825-1:2015-07: "Sicherheit von Lasereinrichtungen—Teil 1: Klassifizierung von Anlagen und Anforderungen (IEC 60825-1:2014)" (Safety of laser products—Part 1: Equipment classification and requirements).
[4] M. R. Pakravan, E. Simova and M. Kavehrad, "Holographic diffusers for indoor infrared communication systems," Proceedings of GLOBECOM'96. 1996 IEEE Global Telecommunications Conference, London, UK, 1996, pp. 1608-1612 vol. 3.
[5] WO2013032954 (A1): HIGH SPEED FREE-SPACE OPTICAL COMMUNICATIONS.→Multiple VCSELm Diffuser+Microlens Array
[6] Dobroslav Tsonev, Stefan Videv, and Harald Haas, "Towards a 100 Gb/s visible light wireless access network," Opt. Express 23, 1627-1637 (2015).

The invention claimed is:
1. A communication node configured for optical-wireless communication in an optical wireless communication network, comprising:
an input interface configured to receive a data signal;
an optical transmitter configured to convert the data signal into an optical signal comprising an optical power;
separation optics element configured to spatially divide the optical signal into a plurality of optical partial signals comprising an associated spectral range to divide the optical power onto the plurality of optical partial signals, the plurality of spectral ranges at least partially coinciding;

wherein the communication node is configured to provide the plurality of optical partial signals for the optical-wireless communication;

wherein the plurality of optical partial signals collectively form an overall field of view or illumination area and, as being a plurality of optical partial signals are focused at spatially disjoint locations of an image plane when focused together, when using receiver-side optics or when focusing at or in the human eye.

2. The communication node according to claim 1, wherein the separation optics element is configured to divide a beam of the optical transmitter into a plurality of sub-beams, each sub-beam providing one of the plurality of an optical partial signals, the plurality of sub-beams being configured to form a total field of view of the communication node.

3. The communication node according to claim 1, wherein the separation optics element is configured to at least partly compensate for a transit time difference of beams between the optical transmitter and the separation optics element due to different transit times within the separation optics element; or wherein an element is arranged to at least partly compensate for a transit time difference of beams between the optical transmitter and the separation optics element due to different transit times within the element.

4. The communication node according to claim 1, wherein a spacing of focal points is acquired by focusing together and the radiated power of each focal point are each below a limit defined according to DIN EN 60825-1 or IEC 60825-1:2014 and in total exceed this limit.

5. The communication node according to claim 1, wherein the separation optics element comprises a plurality of optically effective surfaces, each of the plurality of optically effective surfaces is associated with one of the optical partial signals; wherein each of the optically effective surfaces comprises an individual geometry and/or an individual area size depending on a relative position between the optically effective surface and the optical transmitter.

6. The communication node according to claim 1, wherein the separation optics element comprises a plurality of optically effective surfaces, each is associated with one of the optical partial signals; wherein each of the optically effective surfaces of the plurality of optically effective surfaces comprise an individual size and/or an individual aspect ratio of sides of the optically effective surface.

7. The communication node according to claim 6, comprising a sub-reflector arranged opposite the separation optics element and configured to receive the optical signal from the optical transmitter and to reflect it back to the separation optics element.

8. The communication optics according to claim 7, wherein the optical transmitter is arranged in a plane of the separation optics element.

9. The communication node according to claim 1, wherein the separation optics element comprises a plurality of optically effective surfaces, each of the plurality of optically effective surfaces is associated with one of the optical partial signals; wherein at least one of the optically effective surfaces comprises no symmetry.

10. The communication node according to claim 1, wherein the separation optics element comprises a plurality of optically effective surfaces, each of the plurality of optically effective surfaces is associated with one of the optical partial signals; wherein the separation optics is configured to redirect the optical signal in another direction by means of total reflection at at least one reflective or totally reflective surface, each optically effective surface being associated with a partial region of the at least one reflective or totally reflective surface.

11. The communication node according to claim 1, wherein the separation optics element comprises a plurality of optically effective surfaces, each of the plurality of optically effective surfaces is associated with one of the optical partial signals; wherein the plurality of optically effective surfaces comprises a different area size which increases with an increasing distance from an optical axis of the optical transmitter.

12. The communication node according to claim 11, wherein the optical transmitter is configured to provide an intensity maximum in the optical signal in a region comprising the optical axis, wherein the separation optics element is configured to provide an optical power per optically effective surface which is equal within a tolerance range of 50% based on the different area size.

13. The communication node according to claim 1, configured to generate the plurality of optical partial signals with matching data information.

14. The communication node according to claim 1, wherein an optical signal power of the optical signal without the separation optics element exceeds an allowed eye safety for the human eye and the plurality of optical partial signals in sum maintains the eye safety.

15. The communication node according to claim 1, wherein the separation optics element is configured to produce a multiple image of the optical signal of the transmitter.

16. The communication node according to claim 1, wherein the optical transmitter comprises a modulating radiation source; or wherein the optical transmitter comprises an optical emitter for providing a first optical signal and a modulator configured to receive and modulate the first optical signal so as to provide the modulated optical signal.

17. The communication node according to claim 1, configured to emit the optical signal in a wavelength range visible to the human eye, and to provide illumination of an environment of the communication node with the wireless optical signal.

18. The communication node of claim 1, wherein the optical transmitter is configured for providing the optical signal with a single emitter.

19. An optical-wireless transmission system comprising:
a communication node according to claim 1; and
a receiver configured to receive at least a portion of the plurality of partial signals;
wherein a field of view of the communication node is adapted to receiving optics of the receiver.

20. A method of providing a separation optics element for an optical-wireless communication node comprising a plurality of optically active surfaces, the following being performed for each of the optically active surfaces:
projecting an inhomogeneous radiation power of an optical emitter onto a projection region by defining a plurality of sub-regions of the projection region such that partial radiation powers of the radiation power incident on the sub-regions are equal within a tolerance range in the plurality of sub-regions;
defining input angles of radiation power onto the optically active surfaces of the separation optics element and associating a respective output angle each to the plurality of partial radiation powers from the separation optics element, the output angles being derived from the sub-region of the projection region;

defining the plurality of sub-regions for the optically active surfaces of the separation optics element such that, when the radiation power arrives, the separation optics element transforms the radiation power with the plurality of sub-regions into a partial radiation power for the projection area associated with a respective sub-region to obtain, from an optical signal impinging the separation optics element, a plurality of partial signals that collectively form an overall field of view or illumination area and, as being a plurality of optical partial signals are focused at spatially disjoint locations of an image plane when focused together, when using receiver-side optics or when focusing at or in the human eye; and manufacturing the separation optics element comprising the plurality of optically active surfaces.

21. The method according to claim 20, wherein projecting is performed based on an inhomogeneous distribution of the radiation power as a three-dimensional inhomogeneous optical light power.

* * * * *